United States Patent
Sommerlatt

(10) Patent No.: US 10,742,939 B1
(45) Date of Patent: Aug. 11, 2020

(54) SECURITY VIDEO DATA PROCESSING SYSTEMS AND METHODS

(71) Applicant: AMAZON TECHNOLOGIES, INC., Seattle, WA (US)

(72) Inventor: Darrell Sommerlatt, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 130 days.

(21) Appl. No.: 16/140,506

(22) Filed: Sep. 24, 2018

(51) Int. Cl.
*H04N 7/18* (2006.01)
*G06K 9/00* (2006.01)
*G06Q 20/04* (2012.01)

(52) U.S. Cl.
CPC ......... *H04N 7/186* (2013.01); *G06K 9/00771* (2013.01); *G06Q 20/04* (2013.01); *H04N 7/188* (2013.01); *G06T 2207/10016* (2013.01); *G06T 2207/30232* (2013.01)

(58) Field of Classification Search
CPC .... H04N 7/186; H04N 7/188; G06K 9/00771; G06Q 20/04; G06T 2207/10016; G06T 2207/30232
See application file for complete search history.

(56) References Cited

U.S. PATENT DOCUMENTS

| | | | |
|---|---|---|---|
| 4,764,953 A | 8/1988 | Chern et al. | |
| 5,428,388 A | 6/1995 | Von Bauer et al. | |
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 6/2006 | Lee | |
| 7,109,860 B2 | 9/2006 | Wang | |

(Continued)

FOREIGN PATENT DOCUMENTS

| CN | 2585521 Y | 11/2003 |
|---|---|---|
| CN | 2792061 Y | 6/2006 |

(Continued)

*Primary Examiner* — Janese Duley
(74) *Attorney, Agent, or Firm* — Lathrop GPM LLP

(57) ABSTRACT

Identifying a person committing a crime in video data captured by a security device. An information request message identifying the video data and a need for information about the video data is received. When the video data is determined suitable for sharing within a geographic network, an access control of the video data is set to allow a client device registered with the geographic network to display the video data. A display control value of the video data is set to direct display of a label with the video data to indicate the need for the information. A rating of usefulness of the information received from the client device is determined and a first value is added to an account associated with the client device based at least in part upon the rating.

20 Claims, 14 Drawing Sheets

(56) References Cited

U.S. PATENT DOCUMENTS

| | | |
|---|---|---|
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2013/0057695 A1 | 3/2013 | Huisking |
| 2013/0346333 A1* | 12/2013 | Hassler ............... G06Q 10/107 |
| | | 705/325 |
| 2015/0035987 A1 | 2/2015 | Fernandez |
| 2015/0127340 A1* | 5/2015 | Epshteyn ............... G10L 15/26 |
| | | 704/235 |
| 2018/0047269 A1* | 2/2018 | Thomas ............... H04M 11/025 |
| 2018/0307903 A1* | 10/2018 | Siminoff ............ G06K 9/00369 |
| 2018/0349684 A1* | 12/2018 | Bapat ............... G08B 13/19645 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

* cited by examiner

SECURITY VIDEO DATA PROCESSING SYSTEMS AND METHODS

TECHNICAL FIELD

The present embodiments relate to security systems that include sensors, automation devices, and/or audio/video (A/V) recording and communication devices. In particular, the present embodiments relate to improvements in the functionality of security systems that strengthen the ability of such systems to reduce crime and enhance public safety.

BACKGROUND

Home safety is a concern for many homeowners and renters. Those seeking to protect or monitor their homes often wish to be informed of breaches to the security of their homes and also have video and audio communications with visitors/trespassers, for example those persons visiting/trespassing near an external door or entryway. Security systems that include sensors, automation devices, and/or A/V recording and communication devices, such as doorbells, provide this functionality and can also aid in crime detection and prevention. For example, sensor information, audio, and/or video captured by a security system, such as by an A/V recording and communication doorbell of a security system, can be uploaded to the cloud and recorded on a remote server. Subsequent review of the sensor information and/or the A/V footage can aid law enforcement in capturing perpetrators of home burglaries and other crimes. Further, the presence of a security system including at least one A/V recording and communication device on the exterior of a home, such as a doorbell unit at the entrance of a home, acts as a powerful deterrent against would-be burglars.

BRIEF DESCRIPTION OF THE DRAWINGS

The various embodiments of the present security video data processing systems and methods now will be discussed in detail with an emphasis on highlighting the advantageous features. These embodiments depict the novel and non-obvious security video data processing systems and methods shown in the accompanying drawings, which are for illustrative purposes only. These drawings include the following figures, in which like numerals indicate like parts.

DETAILED DESCRIPTION

Figure 1A:
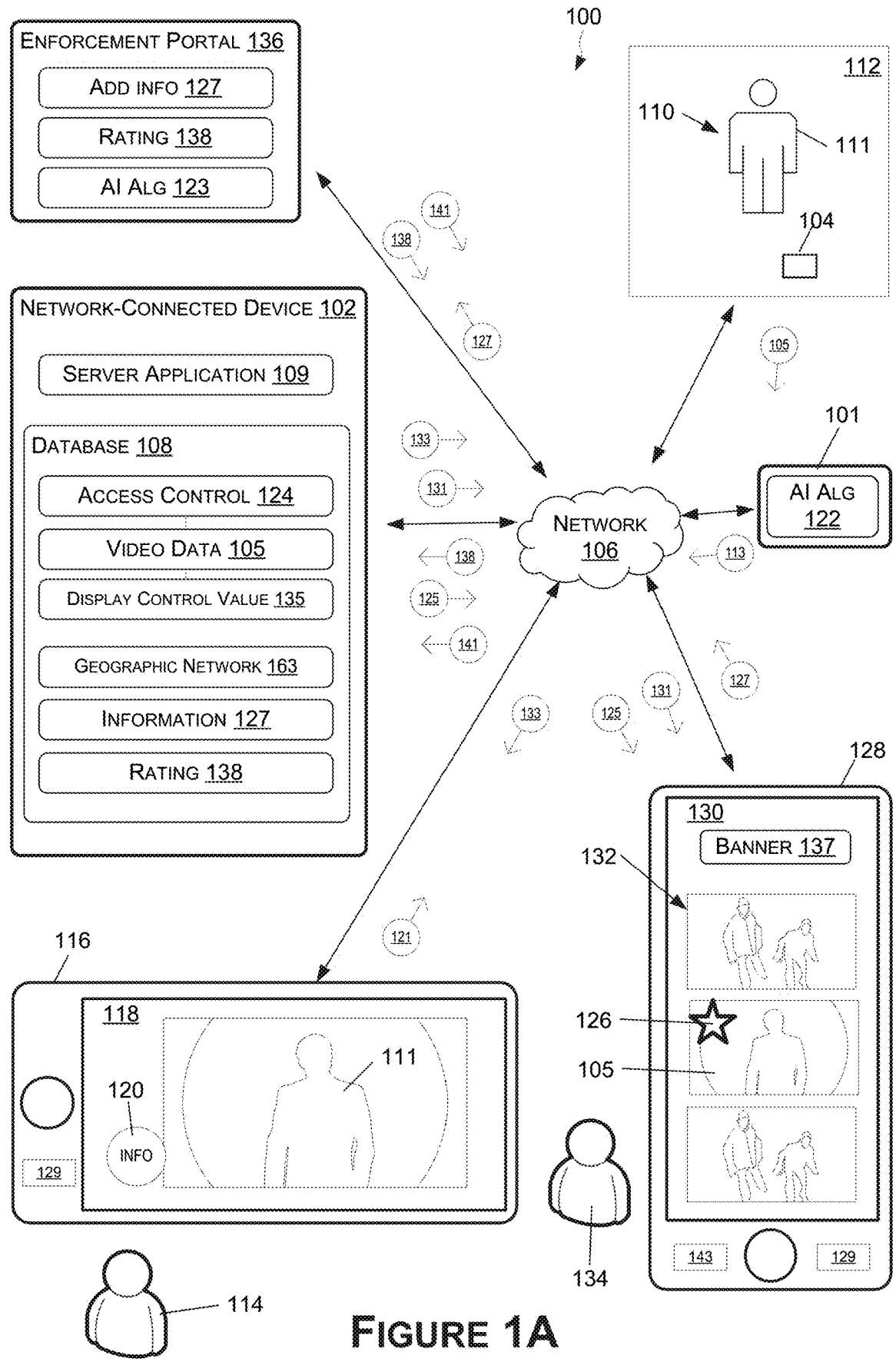
FIG. 1A is a schematic diagram of an example of a security video data processing system, according to various aspects of the present disclosure.

The various embodiments of the present security video data processing systems and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that a user (e.g., an owner) of a security device may wish to learn more as to content of certain video and/or audio captured by the security device. For example, where the security device captures video and/or audio of a person taking a package from a front porch of a residence, unless the person is known to the user, or to law enforcement when involved, the package is unlikely to be traced and/or recovered. In another example, where a mischievous youth rings the doorbell late at night and runs away before the door is opened, the security device may capture video and/or audio of the event, but unless the user recognizes the youth in the captured video and/or audio, the youth cannot be held accountable. The present embodiments solve this problem by allowing the user to publish the captured video and/or audio to a media site accessible by neighbors of the user (e.g., people within a geographic area surrounding a location of the security device), notifying the neighbors of the published video and/or audio, and indicating that the user wishes to learn additional information (e.g., a name of the person, a place that person was previously or last seen, and so on) on content of the video and/or audio. Advantageously, this process of publishing the captured video and/or audio and notifying the neighbors of the request for additional information likely leads to the user receiving the additional information, since the neighbors are incentivized to view the video and/or audio to help the user, and thereby further enables the user to identify the perpetrator (e.g., the person and/or the mischievous youth).

Another aspect of the present embodiments includes the realization that neighbors (people) in a neighborhood may often publish video and/or audio captured by security devices located in that neighborhood, and the neighbors often do not have the time to view every published video and/or listen to published audio. Thus, even when one neighbor could have recognized someone in the video and/or audio, the neighbor may not have watched the video or listened to the audio and therefore does not contribute additional information to the user. The present embodiments solve this problem by including a label with the notification and with the video and/or audio in a media list of the media site such that neighbors are aware of the interest of the owner to learn additional information on content of the video and/or audio. Advantageously, this process of including a label with the published video and/or audio and notification incentivizes the neighbors to view the video and/or listen to the audio to see whether they can provide the additional information to the user.

A security video data processing system may include a network-connected device (e.g., a server, backend server, cloud based server, etc.) that receives video data from security devices (e.g., a video doorbell, a floodlight camera, and so on) configured to protect one or more sites (e.g., a home, a residence, an office, a store, and so on). For example, a user may have one or more security devices positioned to monitor a home. A client device (e.g., a mobile device, a smartphone, a notebook computer, a tablet computer, and so on) of the user may run an application associated with the security video data processing system that may receive notifications from the security video data processing system to indicate an event detected at the site by the security device. For example, the security device may be configured to detect motion of the event at the site. In response to the detected motion, the security device may capture video data (e.g., video and audio) of the event and send the video data to the network-connected device where it may be stored, at least temporarily, within a database. The user may use the client device to view the video and/or listen to the audio as it streams (e.g., live) from the security device, or may later replay the video data from the database of the network-connected device on the client device.

Where the event is a crime (e.g., a person breaking into a residence, stealing a parcel from a front porch, damaging property, and so on), the video data may include evidence of the crime. The user may be unable to recognize a person in the video data, and therefore may be unable to take further action on the event and/or crime. For example, when the video shows a mischievous person approaching a front door of the user's home late at night, pressing the doorbell button, and then running away, unless the user recognizes the person, the person may remain unknown for this type of activity. Often, however, perpetrators of neighborhood events are local and/or known to people of the neighborhood where the event occurs. In the above example, it may be a wayward person of a nearby neighborhood that presses the doorbell button at 11:00 PM and runs away before the door can be answered. In another example, the video may show a person peering into windows of a structure at the site. In each of these examples, the user may wish to learn information about the video data, such as an identity (e.g., name) of the perpetrator and/or where that person has been seen before. Upon learning such information, the user may be able to take further action against the perpetrator, when desired. In the above examples, the user may speak to the parents of and/or confront the perpetrator about pressing the doorbell and running away, and/or the user may provide the information about the person peering into windows to an enforcement agency (e.g., local police).

Although the user may share the video data, when approved for sharing, with neighbors (e.g., other users belonging to a geographic network that may be a neighborhood network to which the user and the neighbors are registered based upon their geographic location, as described with reference to FIG. 7), unless motivated, the neighbors may not play the video data since they are unaware that information about the video is needed.

The security video data processing system disclosed herein allows the user to indicate, through the application running on a mobile device and/or via a web site associated with the security video data processing system, that information about the video data is needed. Accordingly, the security video data processing system may share, when approved for sharing, the video data with neighbors (e.g., other members of the geographic network) and include a label to indicate the need for information about the video data. The label distinguishes this video data from other "information only" video data that does not include the label but is available to the neighbors. Accordingly, when seeing the video data with the label, the neighbors are more likely to play the video data to see whether they can provide information. The more people that play the video data, the more likely that at least one person will recognize the person in the video data and be able to provide an identity of the person.

The label may be part of an interactive interface element that accepts the information from the person playing the video data. In certain embodiments, when the information is provided to the user interface element, the information may be forwarded to an enforcement agency. For example, where the event is a crime and the user has notified the police of an attempted break-in, the label may indicate that the information, when provided, may be forwarded to an enforcement portal used by a police officer.

The enforcement portal may be used by the police officer to define a rating for the information based at least in part upon usefulness of the information in solving a crime. For example, where the information includes a name that leads to the identification and apprehension of the perpetrator, the enforcement portal may return the rating with a high value. Where the information was less helpful, the enforcement portal may return the rating with a low value. The rating may be used to determine a value that is accumulated within an account of the neighbor that provided the information. This account may then accumulate value based at least in part upon usefulness of the information provided by the neighbor. In certain embodiments, the value of the account may be used to characterize the neighbor. For example, where the neighbor frequently provides information that has a high rating, the neighbor may be characterized highly within the neighborhood, and thereby deemed more reliable at providing information.

The label displayed in association with the video data may indicate urgency of receiving the information by the user. The urgency may be based, at least in part, upon an importance and/or severity of the event captured in the video data, and/or a value of the information needed. For example, where the video data includes a person breaking into a residence, the urgency indicated by the label may be high, providing more incentive for another user to play the video data in hope of being able to provide the information. In another example, where the user has not received the information after one week of posting the video data, the label may indicate increased urgency for the information, and thereby provide additional incentive for neighbors to play the video data. In certain embodiments, the urgency may increase (or in some cases decrease) with time. For example, where the user has not received the information within a couple of weeks, the event may be too stale such that the urgency decreases and focus is directed toward more recent events. In another example, where the event is part of a serious crime that earns the attention of the press, the urgency may increase with time as interest in the event and associated crime increases.

The remaining detailed description describes the present embodiments with reference to the drawings. In the drawings, reference numbers label elements of the present embodiments. These reference numbers are reproduced below in connection with the discussion of the corresponding drawing features.

FIG. 1A is a schematic diagram showing an example security video data processing system 100, according to various aspects of the present disclosure. The security video data processing system 100 includes a network-connected device 102 communicatively coupled with at least one security device 104 via a network 106. The security device 104 may represent one or more of an audio/video communication device, a video doorbell, a floodlight camera, and so on. The network-connected device 102 may be a computer with at least one processor and memory storing a server application 109 and a database 108. The server application 109 may include machine readable instructions stored in the memory that when executed by the at least one processor implement the functionality of the network-connected device 102 described herein. The network-connected device 102 may perform as a backend server or device such as described in connection with FIG. 2. The network 106 may represent one or more of a local area network, Wi-Fi, the Internet, a wide area network, and so on, and may include wired and/or wireless connectivity.

The security device 104 may include one or more sensors (e.g., a camera, a passive infrared sensor(s), a temperature sensor, a microphone, and so on) and/or one or more actuators (a speaker, a light, and so on). For example, the security device 104 may take the form of the A/V recording and communication device 210 of FIGS. 2 and 3. The security device 104 may be configured to detect an event 110 at a site 112, and may capture video data 105 of the event. The event 110 is for example motion of a person 111 detected by a motion sensor of the security device 104. The video data 105 may include an image stream and audio data that may be captured simultaneously. Accordingly, the video data 105 may include images and/or audio of the event 110 at the site 112. The event 110 may be a crime (e.g., a person breaking into a structure at the site 112, a person causing damage at the site 112, a person stealing a package from an entrance of the site 112, and so on), and/or the event 110 may be a person behaving suspiciously (e.g., a person peering into windows of a structure at the site 112, trying to open doors of the structure, running through a back yard at the site 112, and so on), and/or the event 110 may be of a person behaving normally (e.g., approaching a door, pressing a doorbell button, and leaving quickly before the door can be opened). In FIG. 1A, the person detected in the event 110 in each of these situations is illustrated by the person 111.

A user 114 (e.g., the owner of the security device 104 and/or a person authorized to use the security device 104) may use a client device 116 to play the video data 105 on a display 118 and/or speaker of the client device 116. The client device 116 may be a smartphone, a tablet computer, a notebook computer, or another device, such as any of those described below with reference to the client device 214 of FIGS. 2 and 6. The security device 104, the user 114, and/or the client device 116 may be registered with a geographic network 163 of the network-connected device 102. The geographic network 163 may represent a neighborhood (e.g., a neighborhood network of registered computing devices based upon related geographic location of registered devices) of the site 112 and thereby include neighbors of the site 112 and the user 114. For example, owners of security devices (similar to the security device 104) and other residents that are located within the neighborhood of the site 112 may elect to be members of the geographic network 163. In another example, each of these owners of security devices may elect to join the geographic network 163 when registering their security device with the network-connected device 102.

The user 114 (may also be referred to herein as "first user 114") may operate the client device 116 to view and interact with the video data 105, and thereby view and/or interact with a monitored environment at the site 112. In the example of FIG. 1A, the security device 104 may detect the event 110 where the person 111 is present at the site 112, capture and send the video data 105 of the event 110 to the network-connected device 102 and/or to the client device 116, and may allow the user 114 of the client device 116 to interact with (e.g., communicate with) the person 111. The user 114 may also retrieve and play the video data 105 from the network-connected device 102 at a later time.

The client device 116, running an application 129 (see also device application 614 of FIG. 6), may display an information request element 120 (e.g., a selectable button) in association with the video data 105 on the display 118 such that the user 114 may activate (e.g., select, click on) the information request element 120 when information on the video data 105 is desired by the user 114. For example, when the user 114 is unable to identify the person 111 in the video data 105, the user 114 may activate the information request element 120, for example while viewing the video data 105. In certain embodiments, once the information request element 120 has been selected, the user 114 may enter details about the information needed. For example, the user 114 may type the details into a dialog box (not shown) on the display 118, although other input methods (e.g., voice recognition) may be used. The client device 116 may then send an information request message 121 to the network-connected device 102, identifying the video data 105 and including questions and/or a description of the information needed about the video data 105 when entered by the user 114, to indicate that information about the video data 105 is needed. By selecting the information request element 120, the user 114 may further authorize sharing of the video data 105 with other members of the geographic network 163, and/or with an enforcement portal 136. In some embodiments, the video data 105 is not shared with other members of the geographic network 163, or made publicly available, without this explicit authorization by the user 114.

The user 114 may share the video data 105 with the geographic network 163 without requesting information (e.g., without activating the information request element 120). For example, where the video data 105 shows the person 111 passing through the site 112, the user 114 may share the video data 105 with neighbors via the geographic network 163, but does not need information about the video data 105.

Publication

In response to receiving the information request message 121 (or a request to share the video data 105 within the geographic network 163), the network-connected device 102 (e.g., the server application 109) may first send the information request message 121 and/or the video data 105 to a security monitoring service 101 to determine whether the information request message 121 and/or the video data 105 are appropriate for sharing (e.g., publication). See, for example, the security monitoring server 228 of FIG. 2. In certain embodiments, the security monitoring service 101 uses one or more artificial intelligence (AI) algorithms 122 to process the video data 105 and/or the information request message 121 to determine whether content of the video data 105 and the information request message 121 is suitable for sharing. In certain embodiments, the security monitoring service 101 includes an interface device (e.g., a portal) that allows a person to evaluate whether content of the video data 105 and the information request message 121 is suitable (e.g., appropriate) for sharing. Content that is not appropriate (e.g., unsuitable) for sharing may include poor quality (e.g., blurred and/or dark video), inappropriate content (nudity, advertising, defamatory information, etc.), and so on. Accordingly, the information requested in the information request message 121 may be rejected; in this case the video data 105 is not shared (e.g., not published) and the user 114 may be advised of the rejection (e.g., via the client device 116). When the security monitoring service 101 determines that the content of the video data 105 is suitable for sharing, the security monitoring service 101 may send a message 113 to the network-connected device 102, and the server application 109 may thereafter configure an access control 124 of the video data 105, to make the video data 105 accessible to a second client device 128 registered with the geographic network 163. The enforcement portal 136 may also belong to and/or be configured to monitor the geographic network 163 (e.g., to monitor video data 105 shared over the geographic network 163) and may therefore also access the video data 105.

In one example, where the user 114 shares the video data 105 with other members of the geographic network 163 (e.g., a neighborhood), but does not request information, another party (e.g., another member of the geographic network 163—a neighbor—or an enforcement officer using the enforcement portal 136, or the security monitoring service 101) may send the information request message 121 to the network-connected device 102 identifying the video data 105. In one example, after reviewing the video data 105, a police officer may use the enforcement portal 136 (which may sometimes be referred to as a police portal) to send the information request message 121 to the network-connected device 102 identifying the video data 105. That is, in certain embodiments, the request for information about the video data 105 need not originate from the owner (e.g., user 114) of the security device 104.

In embodiments, the network-connected device 102 generates the geographic network 163 by defining a geographic area (e.g., the geographic area 704 of FIG. 7) of the neighborhood linking the first client device 116 and the second client device 128. For example, the first client device 116 may have a registered geographic location of the security device 104 (at the site 112), and the second client device 128 may have a registered geographic location of another security device, and these two geographic locations may therefore be used to define this geographic area. Alternatively, the second client device 128 need not be associated with a security device, but may have a registered geographic location of a residence in the neighborhood of the site 112. In one example, the network-connected device 102 generates the geographic area of the geographic network 163 based at least in part upon the geographic location of the site 112 and a radius (e.g., one mile, two miles, five miles, etc.) around the site 112. In another example, the network-connected device 102 generates the geographic area of the geographic network 163 based at least in part upon the geographic location of the security device 104 and/or a geographic location of a security device linked with the second client device 128. In another example, the network-connected device 102 generates the geographic area of the geographic network 163 based at least in part upon a zip code stored in an account linked with the security device 104. In another example, the network-connected device 102 generates the geographic area of the geographic network 163 based at least in part upon input from the client device 116. In another example, the network-connected device 102 generates the geographic area of the geographic network 163 based at least in part upon input from one or more sensors of the client device 116. In another example, the network-connected device 102 generates the geographic area of the geographic network 163 based at least in part upon an IP address used by the client device 116 and/or the second client device 128. In another example, the network-connected device 102 generates the geographic area of the geographic network 163 based at least in part upon input via the enforcement portal 136. In another example, the network-connected device 102 generates the geographic area of the geographic network 163 based at least in part upon input via the security monitoring service 101. In another example, the network-connected device 102 generates the geographic area of the geographic network 163 based at least in part upon a municipal boundary associated with a geographic location of the security device 104 (e.g., of the site 112). Advantageously, the network-connected device 102 may automatically define the geographic area of the geographic network 163 such that the appropriate neighbors are made aware of the request for information about the video data 105.

Continuing with FIG. 1A, a second user 134 (e.g., a neighbor) may have a second security device (not shown) at a home, which is within the neighborhood (e.g., geographic area) of the site 112, and thus the second user 134 is also part of the geographic network 163 and uses the second client device 128 to access the database 108 of the network-connected device 102 via the network 106. FIG. 7 and the associated description provides further examples of neighborhoods. In certain embodiments, access to the database 108, and the video data 105, may appear similar to a media site, wherein access may be made using a browser, and may be accessible from the client devices 116, 128 via the network 106. Alternatively, each of the client devices 116, 128 may run the application 129 to communicate with the network-connected device 102 via the network 106.

In an embodiment, the network-connected device 102 configures the access control 124 associated with the video data 105 to allow members of the geographic network 163 access to the video data 105. Further, when the information request message 121 is received, the network-connected device 102 may set a display control value 135 of the video data 105 to indicate that the video data 105 should be displayed with a label 126 (e.g., an icon) that indicates a need for information about the video data 105. This information, when provided, may be associated or stored in connection with the video data 105 in the network-connected device 102, such as shown in FIG. 1A as information 127. The display control value 135 (also referred to sometimes as "display control") may be a data field that is stored with, or in association with, the video data 105. The label 126 may be displayed on a display 130 of the client device 128, for example.

In embodiments, when the display control value 135 is zero, no information 127 about the video data 105 is needed; and when the display control value 135 is greater than zero, its value may represent urgency for, and/or importance of, the needed information 127. The display control value 135 may thus represent an actual value associated with providing the information 127. The value of the display control value 135 may be determined by at least one of the user 114, the security monitoring service 101, and the enforcement portal 136.

Accordingly, the label 126 may incentivize viewing of the video data 105 by the second user 134. For example, the label 126 may indicate an urgency for, and/or importance of, the information on the video data 105. Neighbors often wish to help their neighbors, and the label 126 advantageously provides a way to do so. In certain embodiments, the label 126 may be based upon the display control value 135. For example, where the display control value 135 has a value of ten, the label 126 may also have a value of ten.

Notification of Needed Information

Once the video data 105 and the information request message 121 is determined suitable for sharing, the network-connected device 102 may send a notification 125 to other members (e.g., to the client device 128 of the second user 134) of the geographic network 163 to indicate that the video data 105 is shared (e.g., is newly accessible). The notification 125 may also indicate (e.g., by including the label 126 or by directing that the label 126 be displayed on the display 130) that information about the video data 105 is desired, and may further indicate the urgency and/or importance of that information within the label 126. In certain embodiments, where urgency of the information about the video data 105 is high (e.g., where the display control value 135 has a high value), a banner 137 may be shown on the display 130 indicating the urgency for the information about the video data 105. For example, in response to the display control value 135 received from the network-connected device 102 with the video data 105, the application 129 may be directed to display the banner 137. In certain embodiments, where the network-connected device 102 includes a web portal accessed by a browser application running on the client device 128, the network-connected device 102 may directly control display of the banner 137 in a web page being displayed on the client device 128. Advantageously, the banner 137 attracts attention of the second user 134 and indicates the urgency for information about the video data 105. For example, the network-connected device 102 and/or the application 129 may show the banner 137 irrespective of other information being shown on the display 130, thereby allowing the second user 134 to select the banner 137 to display the video data 105.

In certain embodiments, when the second user 134 interacts with (e.g., taps or clicks on) the notification 125 and/or the banner 137, the application 129 running on the second client device 128 may download and play the video data 105 on the display 130 of the second client device 128. In another example, in response to the second user 134 selecting the banner 137 or the label 126 on a web page displayed on the display 130 of the client device 128, the network-connected device 102 may play the video data 105 on the display 130.

In another example, the application 129 may retrieve, based at least in part on the geographic network 163, a list of video data 105 and associated display control values 135 from the network-connected device 102, when the second user 134 opens the application 129 on the second client device 128, for example, and may display the retrieved list as a media list 132 on the display 130 of the second client device 128. Where the display control value 135 indicates that information on the video data 105 is desired, the label 126 may be positioned near the video data 105 within the media list 132 as shown in FIG. 1A.

The application 129 may be configured to receive the information 127 that is input to the client device 128 by the second user 134. The application 129 may then communicate the information 127 to the network-connected device 102 via an internal messaging path such that any sensitive content (e.g., identity information of the person 111 and/or details of the event 110) of the information 127 is not publicly accessible. Particularly, where the geographic network 163 includes a message board interface 173 (FIG. 1D) that allows members of the geographic network 163 to share comments on the video data 105, the information 127 may be conveyed to the network-connected device 102 independent of the message board interface 173 such that the information 127 is not viewable by other members of the geographic network 163. This aspect advantageously allows the information 127 to be conveyed privately and may encourage the second user 134 to provide the information 127. In other embodiments, the message board interface 173 implemented for the geographic network 163 may be configured to allow secure and private transfer of the information 127 and thereby the geographic network 163 may be used to convey the information 127 to the network-connected device 102.

Figure 1B:
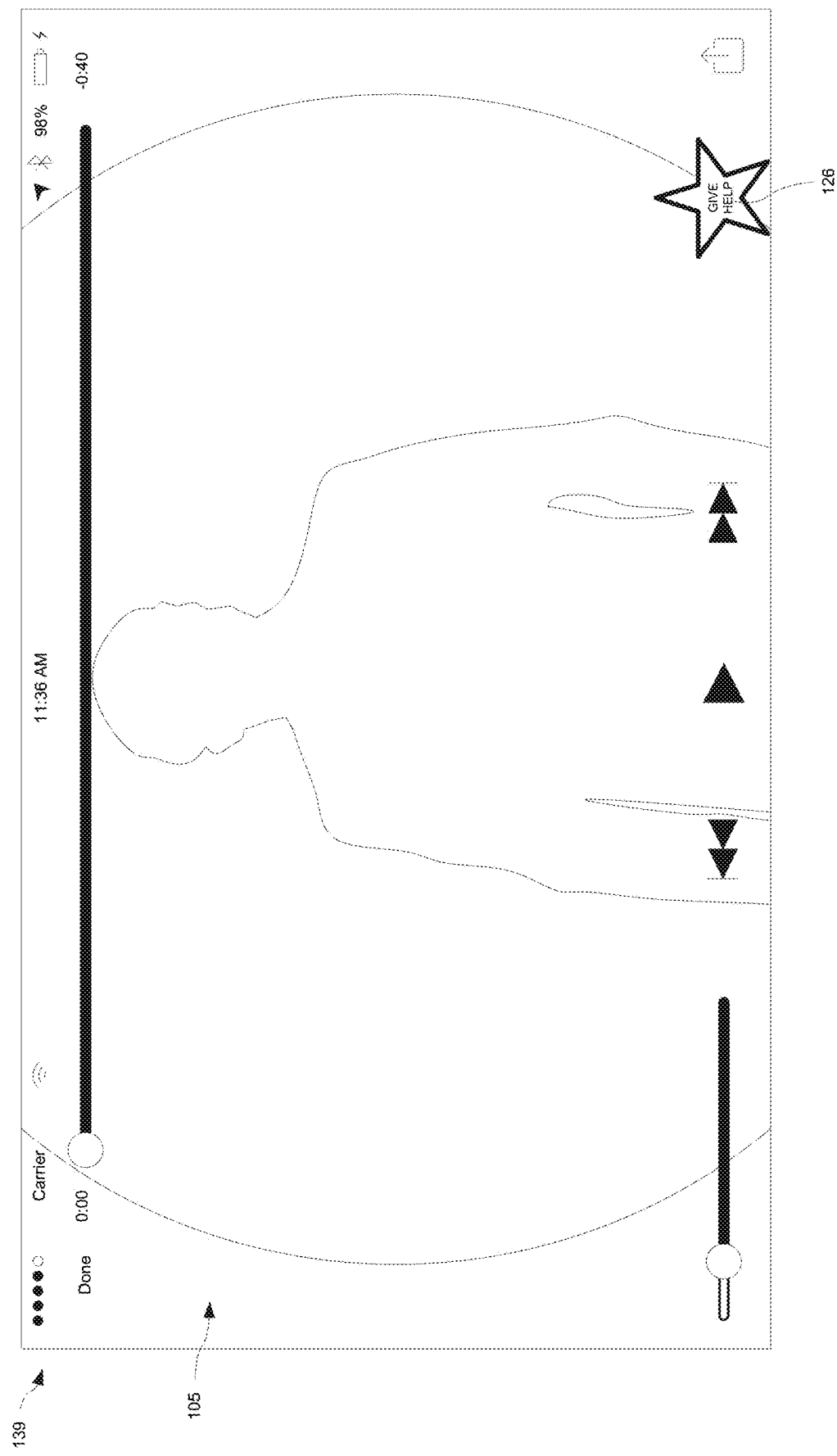
FIG. 1B is a schematic diagram of an example screen shot of the display of the second client device of FIG. 1A, showing the video data and the label of the user interface element, according to various aspects of the present disclosure.

As shown in FIG. 1A, the media list 132 may show at least part (e.g., a frame) of the video data 105 and, where directed by the display control value 135, the label 126 may indicate a desire for information about the video data 105. Advantageously, the label 126 makes the second user 134 immediately aware that the video data 105 should be watched to determine whether the information 127 can be provided. When the second user 134 plays the video data 105 (e.g., by selecting the video data 105 within the media list 132), the application 129 may download the video data 105 from the network-connected device 102 and play the video data 105 on the display 130, as shown in FIG. 1B. The application 129 may also make the label 126 interactive within the media list 132 such that the second user 134 may provide the information 127 by tapping or selecting the label 126.

Figure 1C:
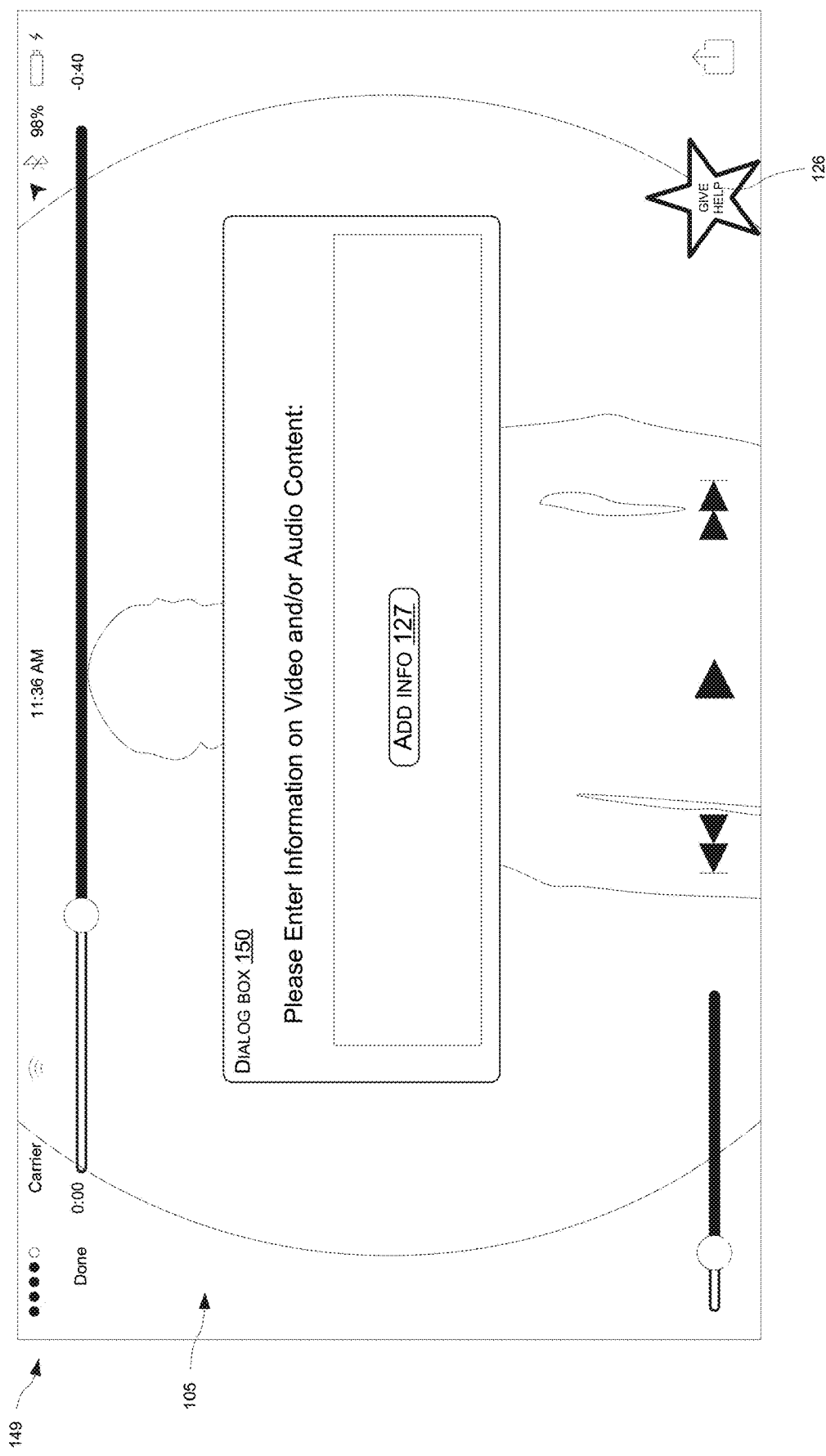
FIG. 1C is a schematic diagram of an example screen shot of the display of the second client device of FIG. 1A, and further showing the dialog box of the user interface element, according to various aspects of the present disclosure.

FIG. 1B is a schematic diagram of an example screen shot 139 of the second client device 128 of FIG. 1A, showing the video data 105 being played on the display 130 with the label 126. When the second user 134 is able to provide the information 127, based at least in part upon viewing and/or listening to the video data 105, the second user 134 may activate (e.g., select, click on) the label 126 to initiate input of the information 127. In response to the activation of the label 126, the application 129 may show a dialog box 150 on the display 130 to receive the information 127, as shown in FIG. 1C. FIG. 1C is a schematic diagram of an example screen shot 149 of the display 130 of the second client device 128 of FIG. 1A showing the dialog box 150. The dialog box 150 may allow the second user 134 to type the information 127 into the second client device 128. In certain embodiments, dialog box 150 may be configured to receive verbal (e.g., voice) input using a microphone 143 of the second client device 128, allowing the second user 134 to speak the information 127 to the second client device 128. For example, the server application 109 of the network-connected device 102, and/or the application 129 of the client device 128, may implement or use a transcription service (e.g., transcription service 160 of FIG. 1D) that transcribes the verbal input into text for inclusion in the information 127. In another embodiment, the information 127 may include digitized audio data of the verbal input. Once the information 127 is input to the dialog box 150, the application 129 sends the information 127 to the network-connected device 102.

The Enforcement Portal

Referring again to FIG. 1A, the enforcement portal 136 may be a user interface device (e.g., a terminal, a browser, a smartphone running an application, a desktop computer running an application, and so on). The enforcement portal 136 may be used by one or both of a law enforcement agency (e.g., a police department) and a security firm or agency to access information shared within the geographic network 163 and/or forwarded from the network-connected device 102. The enforcement portal 136 may implement a secure login process using one or more of a password, biometric identification (e.g., fingerprint, retinal scan, facial recognition, and so on), and similar techniques for securely identifying the person using the enforcement portal 136. Accordingly, captured and received information (e.g., the video data 105, the information 127, etc.) remains secure within the security video data processing system 100.

The enforcement portal 136 may be a member of the geographic network 163, such that the enforcement portal 136 may access the video data 105 and/or the information 127. For example, when the user 114 shares the video data 105 within the geographic network 163, the video data 105 may also be accessible to the enforcement portal 136.

In certain embodiments, the network-connected device 102 sends the information 127 to the client device 116 of the user 114, wherein the user 114 may determine, based at least in part upon usefulness of the information 127, and send a rating 138 to the network-connected device 102. The rating 138 is a value that indicates usefulness of the information 127 and/or how well the information 127 answers the information request message 121. For example, a police officer using the enforcement portal 136 may determine the rating 138 based upon usefulness of the information 127 for solving a crime associated with the event 110 indicated by the information request message 121. In one embodiment, the rating 138 is a Boolean value, being one of true or false. In another embodiment, the rating 138 may have a value range, such as, for example, between one and five. For example, the enforcement portal 136 may be used to assign a value of five to the rating 138 when the information 127 led to a perpetrator being apprehended for a crime. In another example, the user 114 may assign a value of three to the rating 138 when the information 127 includes a name of a place where the perpetrator had been seen, which in turn allows the user 114 (or the police) to identify and confront the perpetrator. In another embodiment, the rating 138 may be a text string containing between one and five (or any other quantity) stars to indicate usefulness of the information 127. The rating 138 may be of other types and ranges of values without departing from the scope of the embodiments described herein. Advantageously, the rating thus provides feedback indicative of usefulness of the information 127 to the user 114 and/or other parties (e.g., law enforcement).

In certain embodiments, the network-connected device 102 may receive multiple ratings 138, such as from both the enforcement portal 136 and the client device 116 of the user 114. When receiving multiple ratings 138, the network-connected device 102 may combine the ratings 138. In certain embodiments, where multiple ratings 138 are received, the multiple ratings are averaged. In other embodiments, where multiple ratings 138 are received, a maximum value of the multiple ratings 138 is used. In yet other embodiments, where multiple ratings 138 are received, a most recent of the multiple ratings is used. In other embodiments, the security monitoring service 101 determines the rating 138 based upon usefulness of the information 127 and sends the rating 138 to the network-connected device 102. In one example, a person at the security monitoring service 101 evaluates the information 127 and the video data 105 to determine the rating 138. In another example, the person at the security monitoring service 101 interacts with one or more of the user 114 and a person using the enforcement portal 136 to determine the usefulness of the information 127 and thereby determine the rating 138.

Figure 1D:
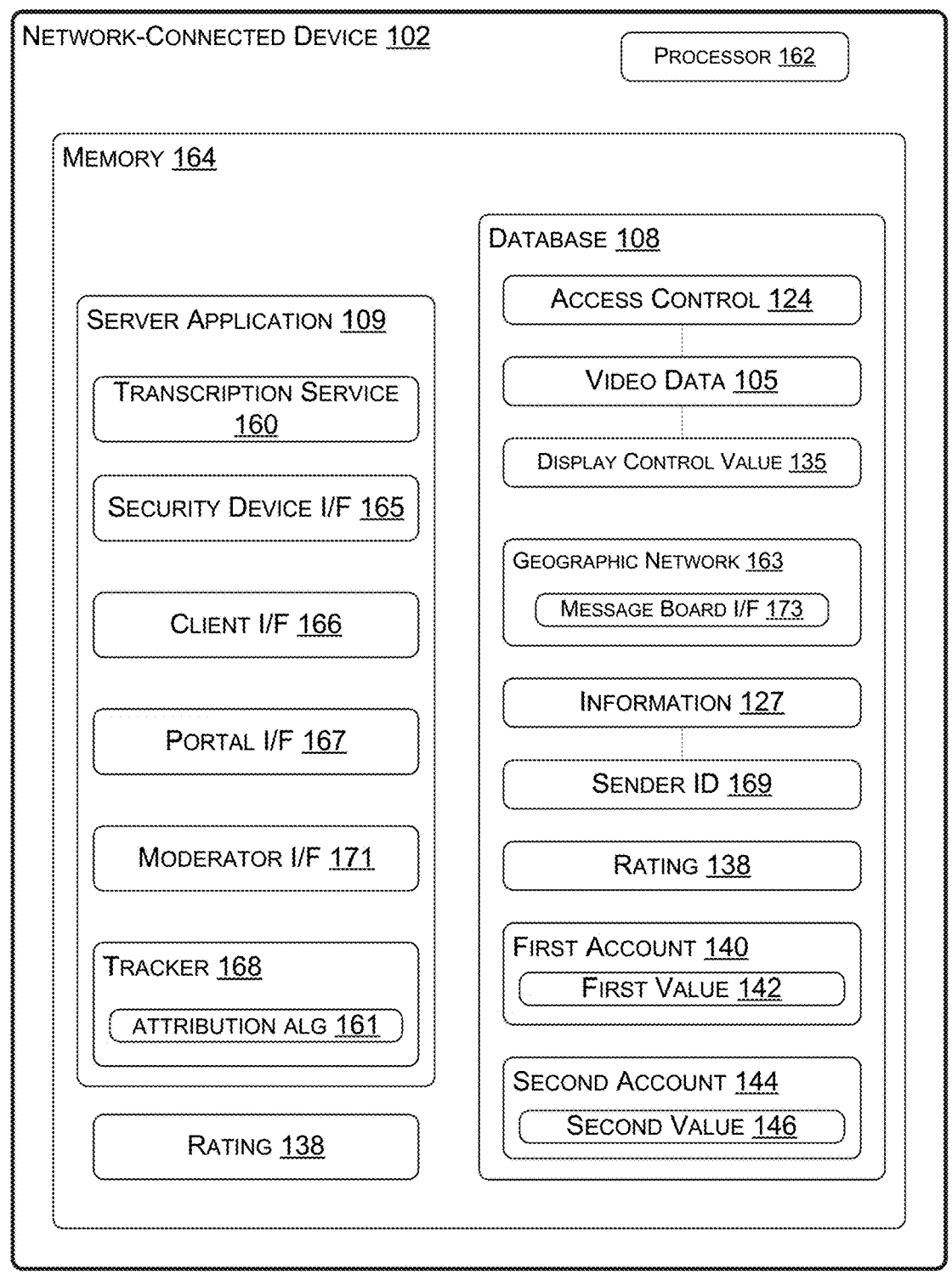
FIG. 1D is a block diagram illustrating the network-connected device of FIG. 1A in further example detail, according to various aspects of the present disclosure.

FIG. 1D is a block diagram illustrating the network-connected device 102 of FIG. 1A in further example detail. The network-connected device 102 includes at least one processor 162 communicatively coupled with memory 164 that may store the server application 109, the database 108, and the rating 138. The database 108 may also include a first account 140 and a second account 144 for the first user 114 and the second user 134, respectively. The accounts 140 and 144 may be part of the registration for the geographic network 163, for example.

The at least one processor 162 may include any processor, such as a central processing unit (CPU), a microprocessor, an application-specific integrated circuit (ASIC), an ARM processor (a processor based on the RISC (reduced instruction set computer) architecture developed by Advanced RISC Machines (ARM)), a controller, a microcontroller, etc. In certain embodiments, the at least one processor 162 may comprise multiple processors, and may include one or more other processors, such as one or more microprocessors, and/or one or more supplementary co-processors, such as math co-processors. Although shown within the memory 164, the database 108 may be stored external to the network-connected device 102 without departing from the embodiments described herein. For example, the database 108 may be stored within a remote storage device similar to the remote storage devices 222 of FIG. 2.

The network-connected device 102 may also include a security device interface 165, implemented as machine readable instructions that, when executed by the at least one processor 162, control the at least one processor 162 to receive the video data 105 from the security device 104 and store the video data 105 within the database 108. The network-connected device 102 may also include a client device interface 166, implemented as machine readable instructions that, when executed by the at least one processor 162, control the at least one processor 162 to send the video data 105, and/or a reference to the video data 105, to one or both of the client devices 116 and 128 for display to the users 114 and 134, respectively, to receive the information request message 121 from the client device 116, and to receive the information 127 from the second client device 128. The network-connected device 102 may also include a portal interface 167, implemented as machine readable instructions that, when executed by the at least one processor 162, control the at least one processor 162 to send the information 127, and/or a reference to the information 127, to the enforcement portal 136. The network-connected device 102 may also include a moderator interface 171, implemented as machine readable instructions that, when executed by the at least one processor 162, control the at least one processor 162 to send the information request message 121 and/or the video data 105 to the security monitoring service 101 and to receive whether the information request message 121 and/or the video data 105 are appropriate for sharing.

The network-connected device 102 may also include a tracker 168, implemented as machine readable instructions that, when executed by the at least one processor 162, control the at least one processor 162 to track the information request message 121, the information 127, and corresponding rating 138 of that information so that appropriate attribution may be applied, for example, to the first account 140 and/or the second account 144. The tracking and correct application of attribution may advantageously incentivize users (e.g., the user 134) to view the video data 105 and to provide the information 127. The security device interface 165, the client device interface 166, the moderator interface 171, and the tracker 168 may collectively form the server application 109, as shown.

The network-connected device 102 may store a sender ID 169, in the database 108, that uniquely identifies the sender (e.g., the client device 128 and/or the second user 134) of the information 127. In certain embodiments, the application 129 running on the client device 128 may include the sender ID 169 with the information 127 when sent to the network-connected device 102. In certain other embodiments, the client device interface 166 may determine the sender ID 169 based upon the communication protocol and/or other information of the information request message 121. The sender ID 169 may advantageously allow the tracker 168 to track the provider of the information 127 so that appropriate attribution is applied, for example, to the second account 144 corresponding to the provider of the information 127.

When the information 127 has been used, and/or after a certain delay (e.g., one week, two weeks, one month, etc.), the tracker 168 may generate (e.g., calculate and/or lookup) a first value 142 using one or both of the display control value 135 and the rating 138. The first value 142 may accumulate in the first account 140 corresponding to the provider (e.g., the second user 134) of the information 127. In certain embodiments, the tracker 168 may also generate (e.g., calculate and/or lookup) a second value 146 using one or both of the display control value 135 and the rating 138. The second value 146 may also accumulate in the second account 144 corresponding to the requester of the information (e.g., the user 114). Advantageously, the user 114 may thus be incentivized to share the video data 105 and send the information request message 121, and the second user 134 may be incentivized to view the video data 105 and provide the information 127 when able. As shown in FIG. 1D, the first account 140 and the second account 144 may be stored within the database 108, and/or may be stored elsewhere without departing from the scope of the embodiments described herein.

The tracker 168 may include an attribution algorithm 161 that determines the first value 142 and/or the second value 146 based, at least in part, upon one or more of the display control value 135, the rating 138, a time of receiving the information request message 121, and a time of receiving the information 127. For example, the tracker 168 may determine the first value 142, and a number of users providing the information 127. In one example, the portal interface 167 may invoke the tracker 168 when the rating 138 is received from the enforcement portal 136, wherein the tracker 168 determines the first value 142 and/or the second value 146 by multiplying the display control value 135 by the rating 138 divided by five (where the rating 138 is a value between one and five). Advantageously therefore, the first value 142 may reflect a value of the information 127 for the video data 105 as perceived by a user (e.g., a user of the enforcement portal 136 and/or the user 114) of the information 127 so that the tracker 168 calculates, or otherwise determines, an appropriate attribution (e.g., the second value 146) for the provider of the information 127.

In certain embodiments, the tracker 168 may also adjust the display control value 135 based, at least in part, upon a time of receiving the information request message 121, a time of receiving the information 127, and a number of users providing information (e.g., the information 127). For example, the tracker 168 may set the display control value 135 to an initial value when the information request message 121 is received. After a certain period (e.g., one week, two weeks, etc.) from when the information request message 121 was received, the tracker 168 may reduce the display control value 135, for example where usefulness of the information 127 may decrease over time. The tracker 168 may also increase the display control value 135 when the need for the information increases and/or when the interest in the information and/or the video data 105 increases. For example, the tracker 168 may determine the interest in the video data 105 based upon an amount of the information 127 received in response to the video data 105: the greater the amount of information 127 received from different client devices, the greater the indicated interest in the video data 105. Accordingly, one or both of the first value 142 and the second value 146 may be calculated by the tracker 168 using the attribution algorithm 161 according to projected usefulness of the information 127. In certain embodiments, the urgency of the information 127 may be indicated via the enforcement portal 136 when the severity of the crime captured in the video data 105 is evaluated by a police officer and entered into the enforcement portal 136, and the tracker 168 determines the display control value 135 based, at least in part, upon the indicated urgency. The tracker 168 may invoke the attribution algorithm 161 to set the first and second values 142, 146, such as described above.

In certain embodiments, based upon the rating 138, the tracker 168 sends a notification 131 to the client device 128 (e.g., the second user 134) to indicate the usefulness (or not) of the information 127. In other embodiments, the notification 131 may indicate the first value 142 and/or the accumulated value of the first account 140. For example, the first value 142 may indicate attribution assigned to the second user 134 for usefulness of the information 127 and the accumulated value of the first account 140 may indicate attribution accumulated by the second user 134. Similarly, the tracker 168 may send a notification 133 to the client device 116 (e.g., to the user 114) to indicate the second value 146 and/or the accumulated value of the second account 144, when determined for the rating 138. For example, the second value 146 may indicate attribution assigned to the first user 114 for providing the video data 105 and/or for requesting the information 127, and the accumulated value of the second account 144 may indicate attribution accumulated by the first user 114.

In certain embodiments, the urgency indicated by the label 126 (e.g., based upon the display control value 135) may represent a monetary and/or credit value (e.g., on-line tokens redeemable for new security equipment, such as the security device 104). Similarly, the first value 142 and the second value 146 may have a monetary and/or credit value. When the label 126 indicates a credit value, any accumulated credit within the first account 140 and/or the second account 144 may be used, by the corresponding user 114, 134, respectively, to purchase additional features and/or equipment for use with the security video data processing system 100. For example, the label 126 may indicate a credit value of ten dollars for received information corresponding to the video data 105. In these embodiments, the rating 138 may be a scaling factor for incentive indicated by the label 126. Using the above example where the rating 138 has a value of four out of a range of one to five and the display control value 135 (and the label 126) indicates a value of ten dollars, the first value 142 and the second value 146 each may be calculated as a credit of eight dollars. Accumulated credit within the first account 140 and/or the second account 144 may then be used to purchase an additional security device 104 for the respective user 134, 114, for example.

In another example, upon receiving the information 127 about the video data 105, the enforcement portal 136 may send the rating 138 with an assigned value of three to the network-connected device 102, such as where the information 127 helped further an investigation. The enforcement portal 136 may send a subsequent rating 141 with an assigned value of five in association with the video data 105 when the information 127 later led to a conviction of a person being investigated and/or led to the investigation being closed. Accordingly, the first account 140 and/or the second account 144 may further accumulate a corresponding first value 142 and/or a second value 146, respectively, based at least in part upon the subsequent rating 141. In certain embodiments, the subsequent rating 141 may override the rating 138, wherein one or both of the first value 142 and the second value 146 are adjusted accordingly.

In certain embodiments, the security monitoring service 101 may interact with one or more of the user 114, the network-connected device 102, and the enforcement portal 136 to determine interest in, and/or response to, the information request message 121 and/or the video data 105. For example, the security monitoring service 101 may evaluate one or more of the information 127, the rating 138, interest of other users (or third parties such as local, state, or federal law enforcement) in the video data 105, the importance of the video data 105, an elapsed time since the information request message 121 was received, and so on. Based upon this interest, the security monitoring service 101 may adjust (e.g., increase and or decrease) the urgency indicated by the label 126.

Figure 1E:
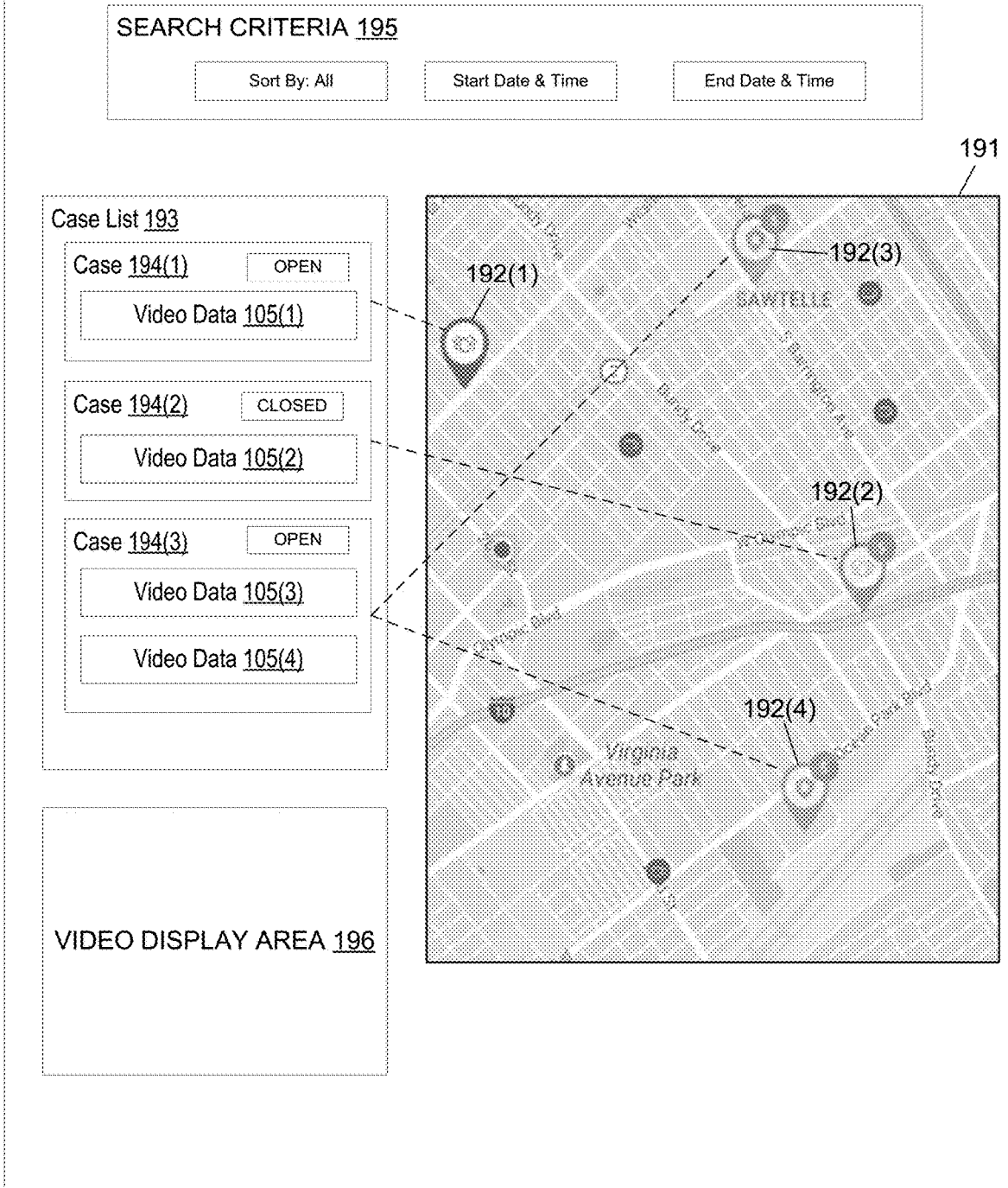
FIG. 1E is a schematic diagram of an example screen shot of the display of the enforcement portal of FIG. 1A showing example grouping of related video data, according to various aspects of the present disclosure.

FIG. 1E is a schematic diagram of an example screenshot 190 of the enforcement portal 136 of FIG. 1A, showing grouping of related video data 105. The screenshot 190 shows a map 191 of a neighborhood being monitored by the enforcement portal 136, with location markers 192(1)-192(4) indicating where the corresponding video data 105 was captured. The screenshot 190 also shows a case list 193 corresponding to the neighborhood, with three example cases 194(1)-194(3). In this example, the case 194(1) corresponds to the location marker 192(1), the case 194(2) corresponds to the location marker 192(2), and the case 194(3) corresponds to the location markers 192(3) and 192(4) (since the case 194(3) contains two video data 105(3) and 105(4)). When an authorized operator of the enforcement portal 136 reviews the video data 105 corresponding to each information request message 121, the operator may determine that both of the video data 105(3) and 105(4) are related because they appear to have content showing the same person, wherein the operator may afterwards group both of the video data 105(3) and 105(4) together within the case 194(3). In certain embodiments, the enforcement portal 136 may use one or more of image analysis and facial matching AI algorithms 123 to process the video data 105, the information request message 121 received from the network-connected device 102, and the video data 105. As shown in FIG. 1E, the enforcement portal screenshot 190 may also allow entry (by an operator) of search criteria 195 that facilitates searching for specific video data 105. For example, the search criteria 195 may allow the operator to specify a search period using a start date and time and an end date and time, wherein the case list 193 may populate with video data 105 that has a capture time within that search period and that was captured by security devices having a geographic location displayed on the map 191. In embodiments, the enforcement portal screenshot 190 also includes a video display area 196 that displays the video data 105 when selected from the case list 193, for example.

Grouping of Video Data Example

Where the facial matching AI algorithms 123 match at least one detected face between the video data 105 and a detected face of an existing case 194, the enforcement portal 136 may add the received video data 105 to that case. In the example of FIG. 1E, the video data 105(3) and 105(4) contain detected facial images that match. By grouping the video data 105(3) and 105(4) within the case 194(3), the operator of the enforcement portal 136 may easily find and review the video data 105. In certain embodiments, the enforcement portal 136 may allow an operator of the enforcement portal 136 to group related video data (e.g., video data 105(3) and 105(4)). In certain embodiments, the security monitoring service 101 may be similarly configured to group the video data 105 based upon matching faces identified within the video data 105.

Figure 1F:
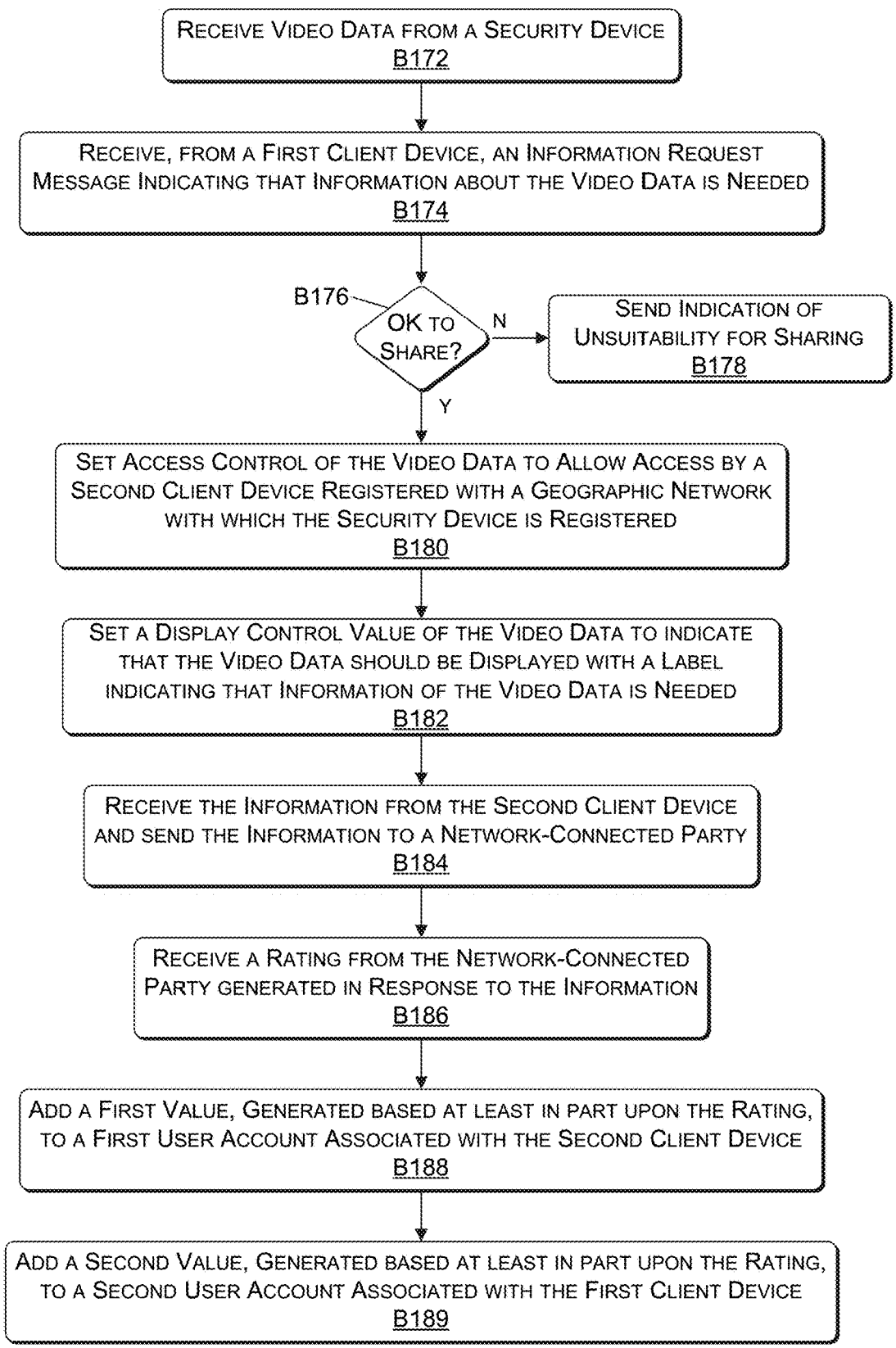
FIG. 1F is a flowchart illustrating an example process for security video data processing, according to various aspects of the present disclosure.

FIG. 1F is a flowchart illustrating an example process 170 for security video data processing, according to various aspects of the present disclosure. The process 170 may be implemented in the network-connected device 102, such as by one or more of the security device interface 165, the client device interface 166, the portal interface 167, and the tracker 168. In block B172, video data is received from a security device. In one example of block B172, the security device interface 165 receives the video data 105 from the security device 104. In block B174, an information request message is received from a first client device indicating that information about the video data is needed. In one example of block B174, the client device interface 166 receives the information request message 121 from the client device 116 when the user 114 activates the information request element 120. Block B176 is a decision. If, in block B176, the process 170 determines that the video data is suitable for sharing, the process continues with block B180; otherwise, the process 170 continues with block B178. In one example of block B176, the video data 105 (or at least a link identifying the video data 105) and the information request message 121 are sent to the security monitoring service 101, and a response indicating suitability of sharing is received. When the response indicates that sharing is acceptable, the process 170 continues with block B180; otherwise the process 170 continues with block 178. In block B178, an indication of unsuitability for sharing is sent. In an example of block B178, the server application 109 sends a message to the client device 116 indicating that the video data 105 and/or the information request message 121 are unsuitable for sharing. The process 170 then terminates without sharing the video data 105 or the information request message 121.

In block B180, access control of the video data is set to allow access by a second client device registered with a geographic network with which the security device is registered. In one example of block B180, the server application 109 configures the access control 124 of the video data 105 to make the video data 105 accessible to the second client device 128 registered with the geographic network 163. In block B182, a display control value of the video data is set to indicate that the video data should be displayed with a label that indicates that information of the video data is needed. In one example of block B182, the network-connected device 102 sets the display control value 135 of the video data 105 to indicate that the video data 105 should be displayed with the label 126 to indicate that information of the video data 105 is needed.

In block B184, information is received from the second client device and sent to a network-connected party. In one example of block B184, the client device interface 166 receives the information 127 from the second client device 128 when the second user 134 enters the information 127 into the dialog box 150, and the client device interface 166 sends the information 127, via the portal interface 167, to the enforcement portal 136. In another example of block B184, the client device interface 166 receives the information 127 from the second client device 128 when the second user 134 enters the information 127 into the dialog box 150, and the client device interface 166 sends the information 127 to the first client device 116.

In block B186, a rating is received from the network-connected party in response to the information. In one example of block B186, the portal interface 167 receives the rating 138 from the enforcement portal 136, in response to the enforcement portal 136 receiving the information 127. In another example of block B186, the client device interface 166 receives the rating 138 from the first client device 116, in response to the first client device 116 receiving the information 127.

In block B188, a first value, generated based, at least in part, upon the rating, is added to a user account associated with the second client device. In one example of block B188, the tracker 168 generates the first value 142, based, at least in part, upon the rating 138, and adds the first value 142 to the first account 140 corresponding to the second user 134. In block B189, a second value, generated based, at least in part, upon the rating, is added to a second user account associated with the first client device. In one example of block B189, the tracker 168 generates the second value 146 based, at least in part, upon the rating 138, and adds the second value 146 to the second account 144 corresponding to the user 114.

Advantageously, the process 170 coordinates attribution of users 114, 134 of the security video data processing system 100 to encourage viewing of published video data 105 and then providing information 127 about the video data 105 when requested. Such coordination and encouragement enhances participation in the geographic network 163 to reduce crime in the neighborhood communities.

Figure 2:
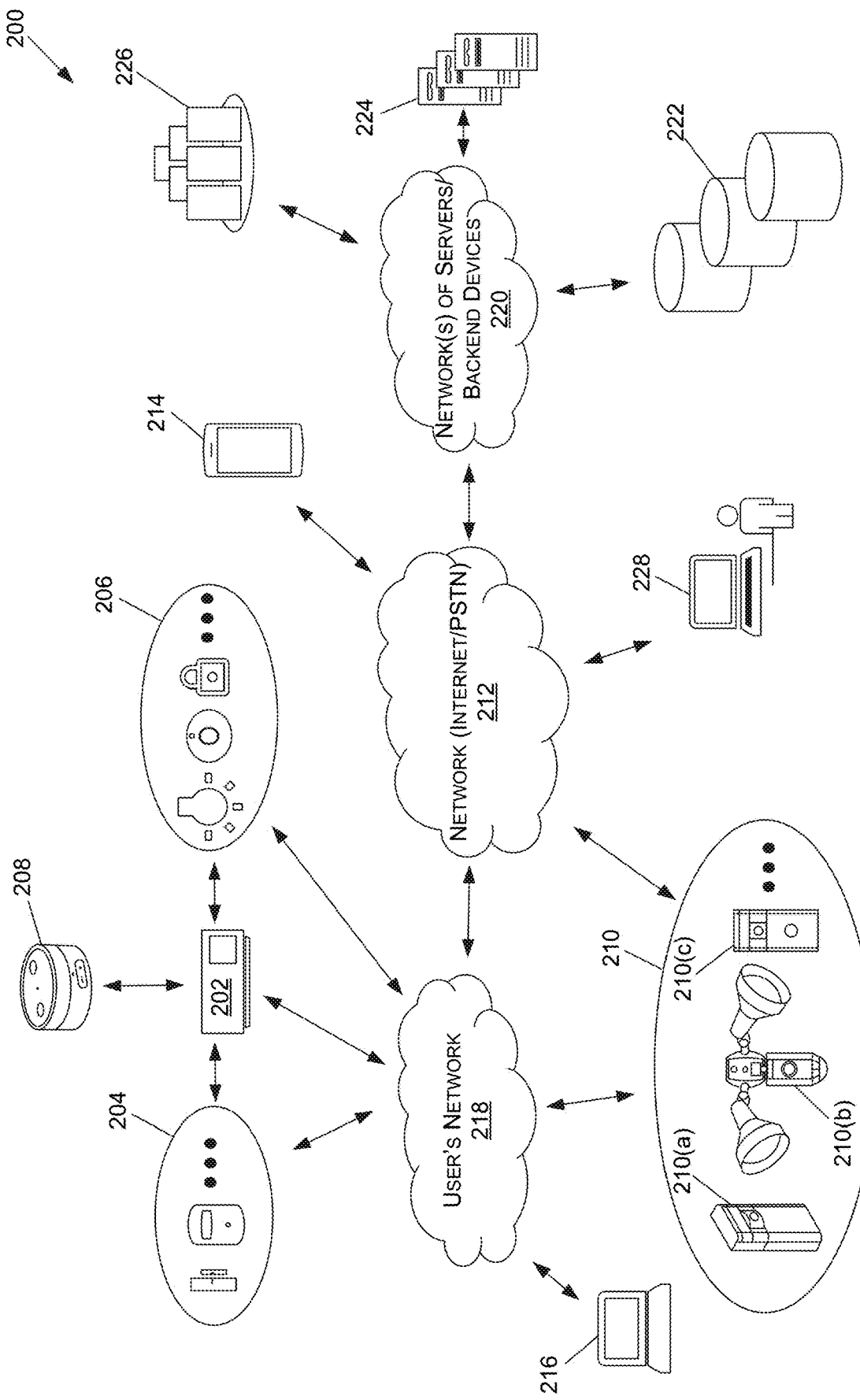
FIG. 2 is a functional block diagram illustrating a system for security video data processing and communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network-connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210"). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g., a real server, or a virtual machine, or a machine running in a cloud infrastructure as a service), or multiple servers networked together, exposing at least one API to clients. In various embodiments, the backend API 226 is provided by servers including various components such as an application server (e.g., software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The network-connected device 102 of FIGS. 1A and 1D may include one or more of the network or backend devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.).

For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

The network-connected device 102 of FIGS. 1A and 1D may have similar components and/or similar functionality to the backend server(s) 224. The security device 104 of FIG. 1A may have similar components and/or similar functionality to the A/V recording and communication devices 210. The network 106 may have similar components and/or similar functionality to one or more of the networks 218, 212, and 220. The client devices 116 and 128 may have similar components and/or similar functionality to any one or more of the client devices 214/218.

Figure 3:
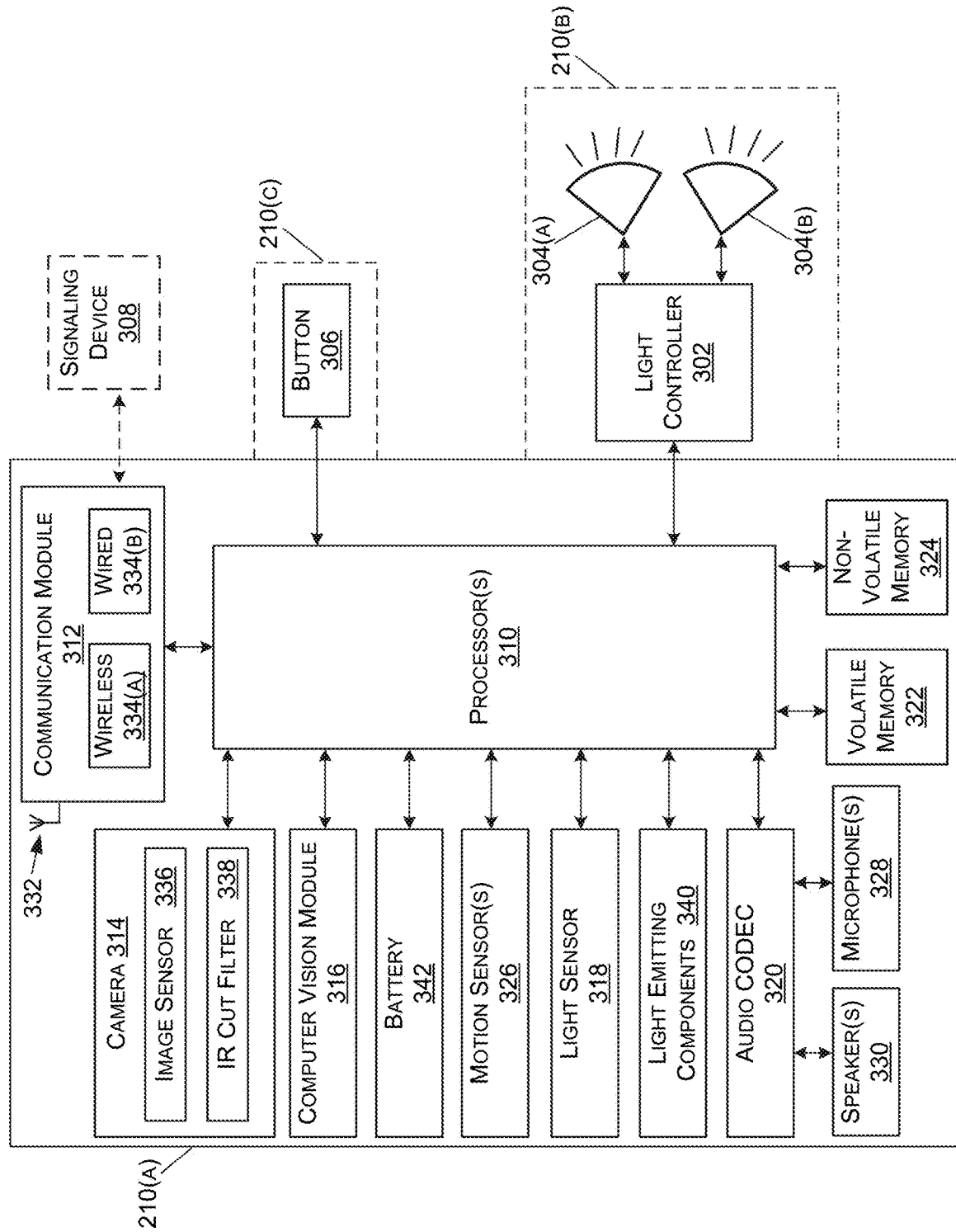
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(*a*). In other embodiments, the one or more A/V devices 210 may include the light camera 210(*b*), which may include some or all of the components of the security camera 210(*a*) in addition to a light controller 302 and one or more lights 304(*a*), 304(*b*). In some embodiments, the one or more A/V devices 210 may include the video doorbell 210(*c*), which may include some or all of the components of the security camera 210(*a*) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(*a*) and wired 334(*b*) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(*c*) is pressed, the communication module 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include Doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the light emitting components 340, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
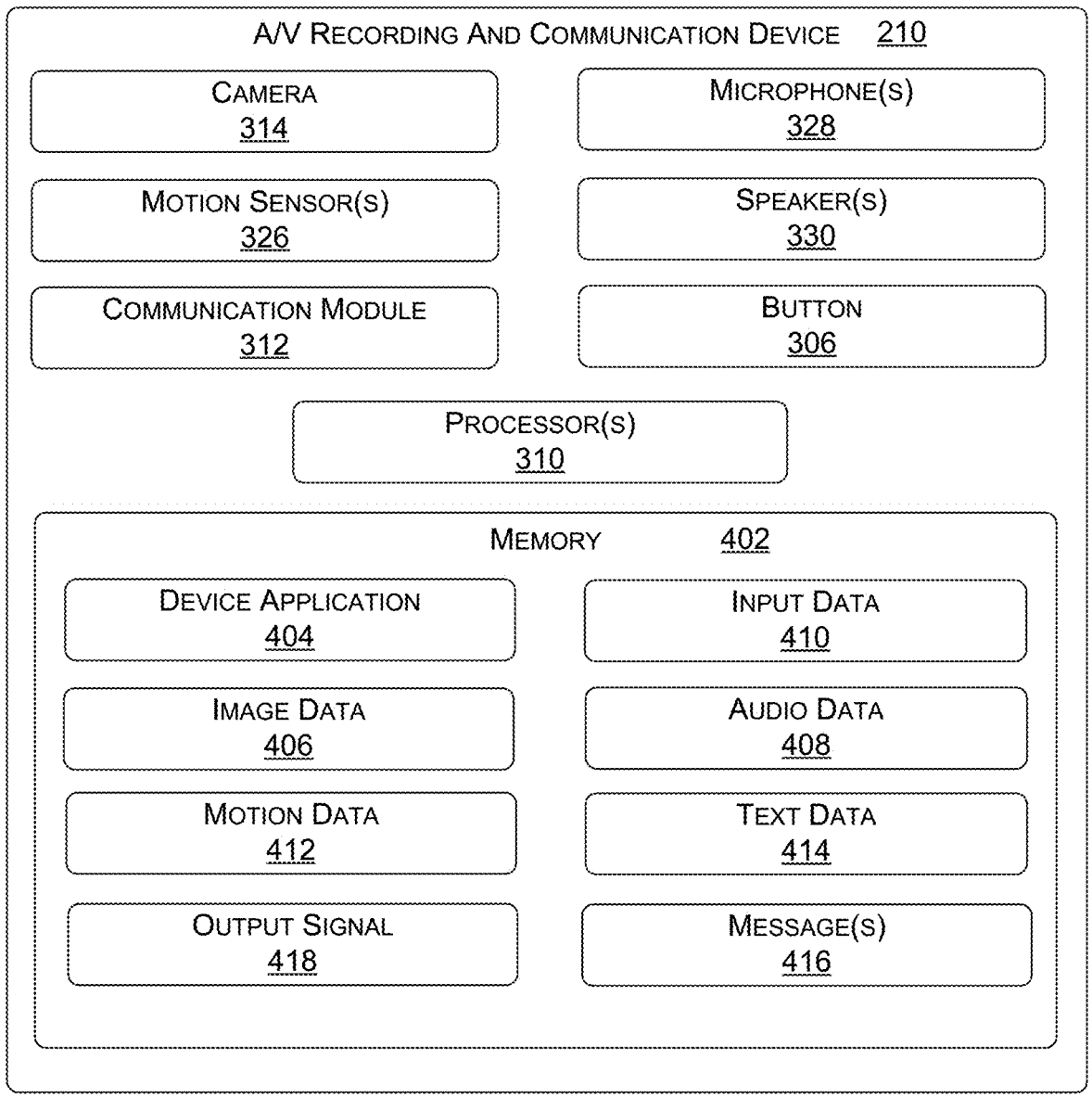
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210.

Figure 5:
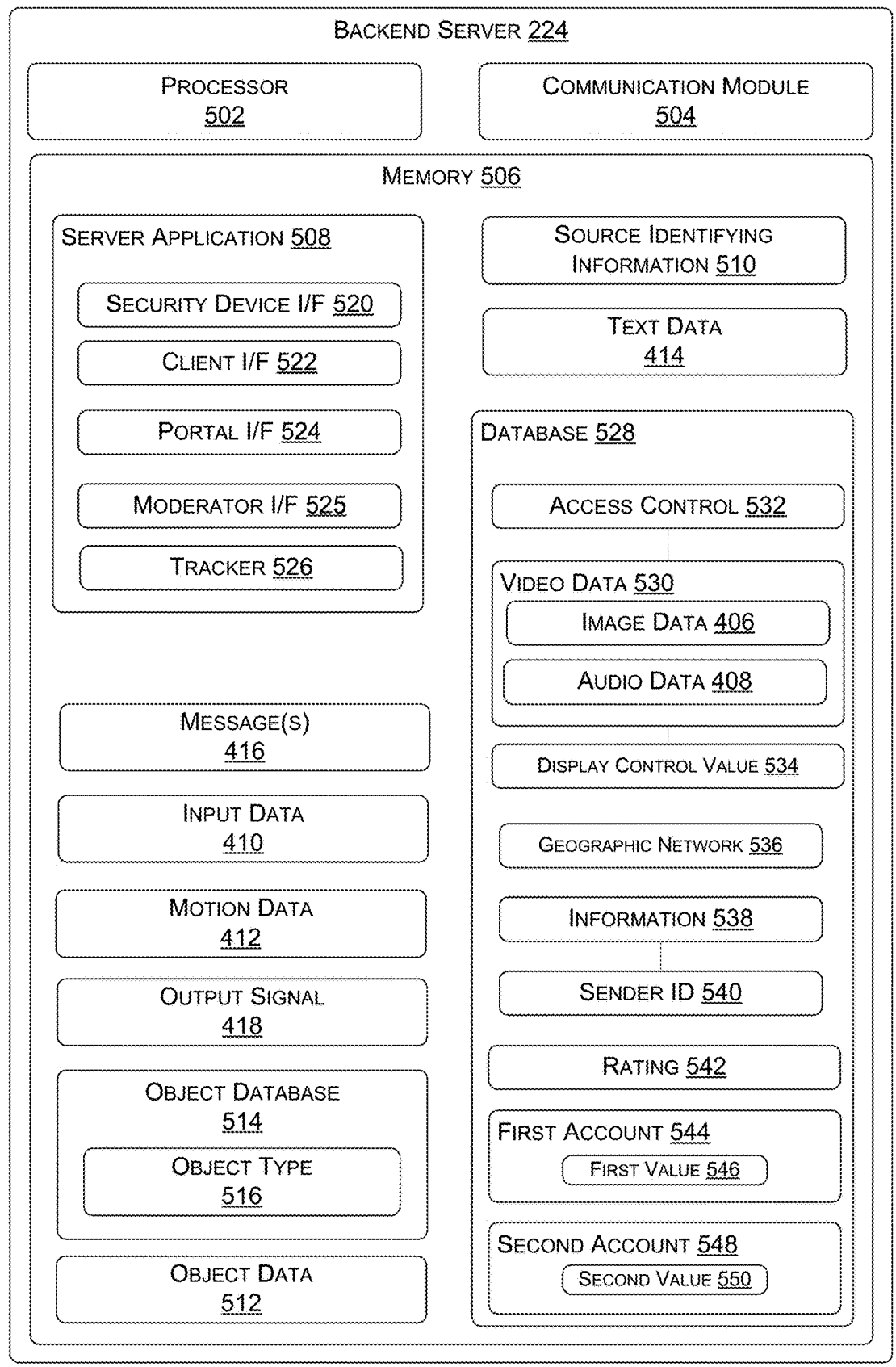
FIG. 5 is a functional block diagram illustrating one example embodiment of a backend device for security video data processing according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 210.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with an enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224.

The server application 508 may also include a security interface 520, a client interface 522, a portal interface 524, a moderator interface 525, and a tracker 526, each implemented as machine readable instructions executable by the processor 502. The security interface 520, the client interface 522, the portal interface 524, the moderator interface 525, and the tracker 526 may include the functionality of the security device interface 165, the client device interface 166, the portal interface 167, the moderator interface 171, and the tracker 168, respectively, of FIGS. 1A and 1D.

The memory 506 is also shown storing a database 528 that is similar to the database 108 of FIGS. 1A and 1D. The database 528 may store the image data 406 and the audio data 408 as video data 530 that has an access control 532 and a display control value 534, which may represent the video data 105, the access control 124, and the display control value 135, respectively. The database 528 may also include a geographic network 536 that is similar to the geographic network 163, information 538 with a sender ID 540 that are similar to the information 127 and the sender ID 169, respectively, a rating 542 that is similar to the rating 138, a first account 544 with a first value 546, and a second account 548 with a second value 550 that are similar to the first account 140, the first value 142, the second account 144, and the second value 146, respectively. Accordingly, the tracker 526 may determine the first value 546, based at least in part upon the rating 542, and may accumulate the first value 546 in the first account 544. Similarly, the tracker 526 may determine the second value 550, based at least in part upon the rating 542, and may accumulate the second value 550 in the second account 548. Accordingly, the backend server 224 may include the functionality of the network-connected device 102 of FIGS. 1A and 1D.

The server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6:
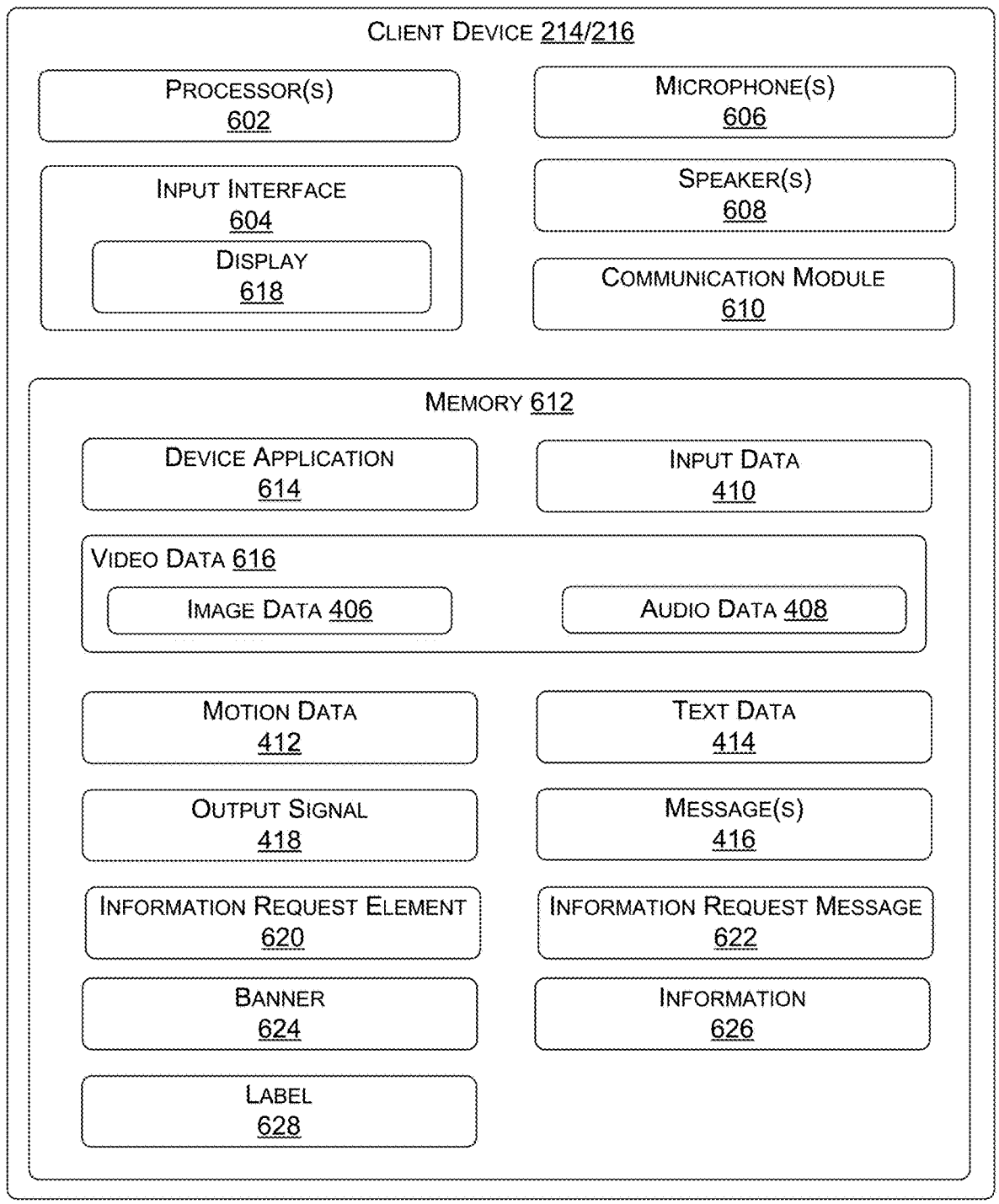
FIG. 6 is a functional block diagram illustrating one example embodiment of a client device for security video data processing according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., the device application 614 may receive a request from the user 114 for information 127 on the video data 105). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., the display 618 may display an information request element to allow a user to request information on the video data displayed on the display). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

The client device 214, 216 may be similar to the client devices 116 and 128 of FIG. 1A and include similar functionality. For example, the device application 614 may be similar to the application 129 and the memory 612 may store the image data 406 and the audio data 408 as video data 616 that may be similar to the video data 105. The memory 612 may also store an information request element 620 that may be shown on the display 618 to allow the user 114 to request information about the video data 616. The memory 612 may also store an information request message 622, that may be generated, when the information request element 620 is selected via the input interface 604, and then sent to the backend server 224 via the communication module 610. The memory 612 may also store a banner 624, information 626, and/or a label 628. The banner 624 may be similar to the banner 137 of FIG. 1A and may be displayed on the display 618 to indicate that information is needed for the video data 616. The label 628 may be similar to the label 126 of FIGS. 1A, 1B, and 1C, and may be displayed on the display 618 with the video data 616 to indicate that information is needed for the displayed video data 616. The information 622 may be similar to the information 127 of FIGS. 1A, and 1D, and may be input to the client device 214/216 via the input interface 604 and sent to the backend server 224.

Figure 7:
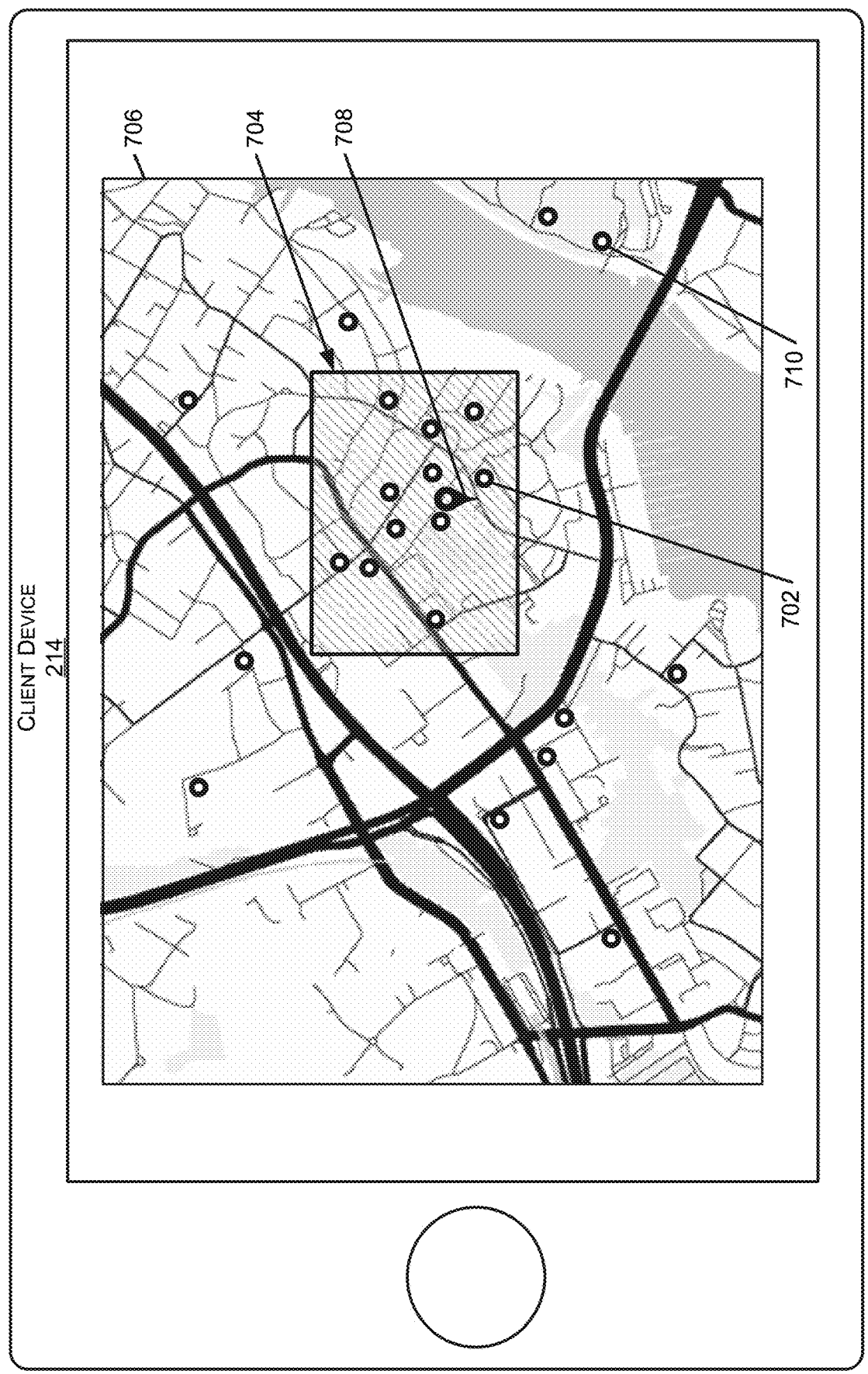
FIG. 7 illustrates an example of a geographic network, according to various aspects of the present disclosure.

FIG. 7 illustrates an example of a geographic network of users, according to various aspects of the present disclosure. In some examples, a geographic network may be executed by a geographic network platform, such as a geographic network platform operating on the backend server 224 and/or one or more other or additional components of the network of servers/backend devices 220. As such, the backend server 224 and/or one or more other or additional components of the network of servers/backend devices 220 may store and/or maintain the components, features, and/or functionality of the geographic network platform. In some examples, and without limitation, the geographic network may be a neighborhood-oriented or local-oriented network, such as Neighborhoods® or Nextdoor®. In other examples, and without limitation, the geographic network may be a social media network (or a feature within a social media network), such as Facebook®, Twitter®, or Instagram®.

The geographic network platform may enable users of the geographic network to share content (e.g., image data (e.g., image data 406), audio data (e.g., audio data 408), text data (e.g., text data 414), input data (e.g., input data 410), motion data (e.g., motion data 412), and/or other data from the user's A/V device (e.g., the A/V device 210) and/or the user's client device (e.g., the client device(s) 214, 216)) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the A/V device 210, the client device(s) 214, 216, etc.) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area.

In some examples, a user may register with the geographic network platform if the user has an A/V device and/or has an application (e.g., a mobile application, a web application, etc.) associated with the geographic network installed on and/or running on his or her client device. When registering for the geographic network, the user may register, or be required to register, with respect to a geographic area. In some examples, a user may register with the geographic area of the geographic network if the user's residence is located within the geographic area and/or the user has A/V device(s) located (e.g., installed) within the geographic area. In some examples, a user may be a member to one or more geographic areas of the geographic network.

In some examples, a user may be verified to a geographic area of the geographic network that the user is asking to join. For example, to determine if the user is actually located within a geographic area, GNSS data of the user's A/V device may be used (e.g., during and/or after installation, provisioning, and/or setup of the A/V device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area that the user is verified for. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the backend server 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's A/V devices, etc.), and/or unique to a geographic area (e.g., all users associated with a geographic area of the geographic network).

In one illustration of a geographic network, the geographic network platform may facilitate a content feed to allow a user of the geographic network to post videos, photos, text, and/or other data to alert other members of possible suspicious activity in a geographic area. Additionally, or alternatively, news items, police sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide information for other users.

A geographic area of a geographic network may be defined using various methods. For example, a geographic area may be associated with one or more neighborhoods, towns, zip codes, cities, states, or countries. In another example, a geographic area may be determined by the backend server 224 based on grouping a particular number of A/V devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

For example, and as illustrated in FIG. 7, a portion of the geographic network is shown. With reference to FIG. 7, and during a setup or registration process with the geographic network, the location 708 to be associated with the user of the client device 214 may be determined (e.g., based on an address being input by the user, based on a determination of the location of the client device 214, based on the location of the A/V device(s) 210 associated with the user (in examples where the user 214 has one or more A/V devices 210), etc.). In some examples, the user may then be associated with the geographic area 704 of the geographic network, such as based on the neighborhood, town, city, zip code, state, country, or other area that the user is located. In one example, the geographic area 704 may be the town that the location 708 associated with the user is located. In other examples, the user may define, on the map 706, the geographic area 704 of the geographic network that the user wishes to have access to content, which may include the location 708 associated with the user. To define the geographic area 704, the user may overlay a predefined shape on the map 706 (e.g., a rectangle, as shown, a circle, a triangle, a square, a polygon, etc.), may position any number of vertices to define a polygon on the map 706, may define a radius about the location 708 associated with the user, may draw the geographic area 704 on the map, etc. The geographic network may limit the size of the geographic area 704 for the user. The size may be limited to a maximum distance in any direction from the location 708 (e.g., a radius) associated with the user of less than, for example and without limitation, two miles, five miles, ten miles, fifteen miles, fifty miles, or the like.

Although the geographic area 704 includes the geographic area 704 of the geographic network that the user may desire to view content from, the content shared by the user may be shared with a larger, smaller, and/or different geographic area of the geographic network than the geographic area 704. For example, the geographic area 704 may include the geographic area that the user can view content in, but any users located within the entire portion of the map 706 displayed on the client device 214 may be able to view content shared by the user of the client device 214 (e.g., depending on the geographic areas defined by and/or associated with the other users located within the portion of the map 706). For example, users of the geographic network having associated location(s) 710 outside of the geographic area 704 may be able to view the content shared by the user of the client device 214, but the user of the client device 214 may not be able to view, or may choose not to view (e.g., by defining the geographic area 704 that does not include the locations 710), the content shared by the user(s) associated with the location(s) 710. In other examples, the geographic area 704 that the user of the client device 214 desires to view content from may also be the same geographic area 704 that users can view content shared by the user of the client device 214. For example, where the geographic area 704 is a town, each of the users located within the town may only be able to view and share content with each other user located in the town. As another example, where the geographic area 704 is defined by the user of the client device 214, the user of the client device 214 may only be able to view content by the users who are located within the geographic area 704 and the users within the geographic area 704 may be the only users that can view content shared by the user of the client device 214.

With further reference to FIG. 7, and during use of the geographic network platform by the user of the client device 214, the user may access a graphical user interface (GUI) on the client device 214 (e.g., within a mobile or web application). The user may desire to view shared content from users of the geographic area 704 of the geographic network. As such, the icons illustrating the locations 702 may be included within the geographic area 702 because data generated by client devices and/or A/V devices of users associated with the locations 702 may be available for viewing. In some examples, the icons may be included because the content has not yet been viewed by the user, because the content was shared within a time period (e.g., within the last day, within the last two days, within the last week, etc.), and/or based on other criteria. The user may select the icons, and in response, the user may receive the content (e.g., the image data, audio data, the text data, etc.) associated with the icons (e.g., from the backend server 224). Although illustrated as icons on a map, in some examples, the content may additionally, or alternatively, be provided as a list. For example, the list may include text describing the content (e.g., date, time, description, location (e.g., as a selectable icon, that when selected may allow the user to view the location on a map), etc.), and individual listings may be selectable, similar to the icons on the map 706.

The process 170 of FIG. 1F described herein is illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

One aspect of the present embodiments includes the realization that the user 114 of the security device 104 may wish to learn more as to content of certain video data 105 captured by the security device 104. For example, where the security device 104 captures video data 105 of a person taking a package from a front porch of a residence, unless the person is known to the user, or to law enforcement when involved, the package is unlikely to be recovered. In another example, where a mischievous person presses the doorbell button late at night and runs away before the door is opened, the security device 104 may capture video data 105 of the incident, but unless the user 114 recognizes the person in the captured video data, the person cannot be held accountable for the incident. The present embodiments solve this problem by allowing the user 114 to share the captured video data 105, when determined suitable for sharing, with neighbors (e.g., people within a geographic area 704 surrounding the geographic location 708 of the security device 104) with the label 126 indicating that the user 114 wishes to learn information 127 (e.g., a name of the person, a place that person was previously or last seen, and so on) about the video data 105. Advantageously, this process of sharing the captured video data 105 with the label 126 indicating the need for information 127 with neighbors likely leads to the user 114 receiving the information 127, since the indication of needed information incentivizes neighbors to view the video data 105 to help the user 114, and thereby enables the user 114 to identify the perpetrator.

Another aspect of the present embodiments includes the realization that many neighbors (people) in a neighborhood (e.g., the area 704) may share video data 105, when determined suitable for sharing, captured by security devices 104 located in that neighborhood, and that the neighbors often do not have the time to frequently check for, and play, every shared video data 105. Thus, even when a neighbor (e.g., the second user 134) could have recognized someone in the video data 105, they may not search for and play the video data 105 and therefore cannot contribute information 127 to the user 114. The present embodiments solve this problem by including the label 126 with the notification 125 of the shared video data 105 and with the video data 105 in the media list 132 such that neighbors (e.g., second user 134) are aware of the interest of the user 114 (e.g., the owner of the security device 104) to learn information 127 about the video data 105. Advantageously, this process of including the label 126 with the shared video data 105 and with the notification 125 both makes the neighbors aware of the shared video data 105 and the need for information 127 about the video data 105 and thereby incentivizes the neighbors (e.g., the second users 134) to play the video data 105 to see if they can provide the information 127 to the user 114.

In a first aspect, a method for identifying a person committing a crime includes installing a video doorbell to view and capture video of an entrance to a home, connecting the video doorbell to Wi-Fi to network the video doorbell with a backend server, associating, within the backend server, the video doorbell with a neighborhood network, capturing video data of a person stealing a package from the entrance to the home using the video doorbell, receiving an information request message from a smartphone linked to the video doorbell to request identity of the person, and assessing whether the video data is suitable for sharing with the neighborhood network. When the video data is suitable for sharing, the method includes setting access control of the video data to allow the video data to be displayed by computers registered with the neighborhood network, setting a display control of the video data to direct that an icon be displayed with the video data to indicate that the identity of the person is desired, receiving identity information about the person in the video data from one of the computers, sending the identity information to a police portal, receiving, from the police portal, a rating indicating usefulness of the identity information in solving the crime of stealing the package, determining a value based upon the rating, and adding the value to an account associated with the one computer, where the account accumulates value based upon usefulness of the identity information for identifying the person.

In certain embodiments of the first aspect, the video data is captured by the video doorbell in response to detected motion of the person near the entrance to the home.

In certain embodiments of the first aspect, a user of the one computer inputs the identity information by selecting the icon displayed with the video data.

In a second aspect, a security video data processing system includes at least one processor and memory storing machine readable instructions that, when executed by the at least one processor, control the at least one processor to: receive an information request message identifying video data captured by a security device of an event at a site and a need for information about the video data; determine that the video data is suitable for sharing within a geographic network including the security device; set an access control of the video data to allow a client device registered with the geographic network to display the video data; set a display control value of the video data to display a label with the video data to indicate the need for the information; receive the information from the client device; determine a rating of usefulness of the information; and add a first value based at least in part upon the rating to an account associated with the client device.

In certain embodiments of the second aspect, the geographic network corresponds to a geographic area containing the site and a registered geographic location of the client device.

Certain embodiments of the second aspect further comprise machine readable instructions that, when executed by the at least one processor, cause the at least one processor to define the geographic area based at least in part upon input from an enforcement portal and a location of the security device.

In certain embodiments of the second aspect, the display control value controls an application running on the client device to display the label with the video data to indicate the need for the information.

Certain embodiments of the second aspect further comprise machine readable instructions that, when executed by the at least one processor, cause the at least one processor to determine the display control value based upon an urgency of the information.

Certain embodiments of the second aspect further comprise machine readable instructions that, when executed by the at least one processor, cause the at least one processor to determine the first value based at least in part upon the display control value.

Certain embodiments of the second aspect further comprise machine readable instructions that, when executed by the at least one processor, cause the at least one processor to add a second value based at least in part upon the rating to a second account associated with a second client device from which the information request message was received.

In certain embodiments of the second aspect, the information request message is received from an enforcement portal.

Certain embodiments of the second aspect further comprise machine readable instructions that, when executed by the at least one processor, cause the at least one processor to: send the information to an enforcement portal; and receive the rating from the enforcement portal.

Certain embodiments of the second aspect further comprise machine readable instructions that, when executed by the at least one processor, cause the at least one processor to adjust the display control value based, at least in part, upon one or more of a date/time of receiving the information request message, a level of interest in the information, and an amount of information received.

Certain embodiments of the second aspect further comprise machine readable instructions that, when executed by the at least one processor, cause the at least one processor to increase the display control value when one or both of the level of interest in the information increases and the amount of information received increases.

Certain embodiments of the second aspect further comprise machine readable instructions that, when executed by the at least one processor, cause the at least one processor to decrease the display control value when a period from the date/time of receiving the information request message to a current date/time is greater than a threshold value.

Certain embodiments of the second aspect further comprise machine readable instructions that, when executed by the at least one processor, cause the at least one processor to: send the information to an enforcement agency; and receive the rating from the enforcement agency.

In a third aspect, a security video data processing method includes receiving an information request message identifying video data captured by a security device at a first location, storing the video data in a database, determining that the video data is suitable for sharing, setting access controls of the video data to make the video data accessible by a client device linked by geographic network with the security device, setting a display control value of the video data to a non-zero value to indicate that information about the video data is needed, receiving the information from the client device, determining a rating based, at least in part, upon usefulness of the information, determining a first value, based, at least in part, upon the rating, and adding the first value to a first user account associated with the client device.

Certain embodiments of the third aspect further comprise adding a second value based, at least in part, upon the rating to a second user account associated with a sender of the information request message.

Certain embodiments of the third aspect further comprise: sending the information to an enforcement portal, and receiving the rating from the enforcement portal.

Certain embodiments of the third aspect further comprise: receiving a subsequent rating from the enforcement portal when the usefulness of the information changes, and adjusting the first value, based at least in part upon the subsequent rating.

Figure 8:
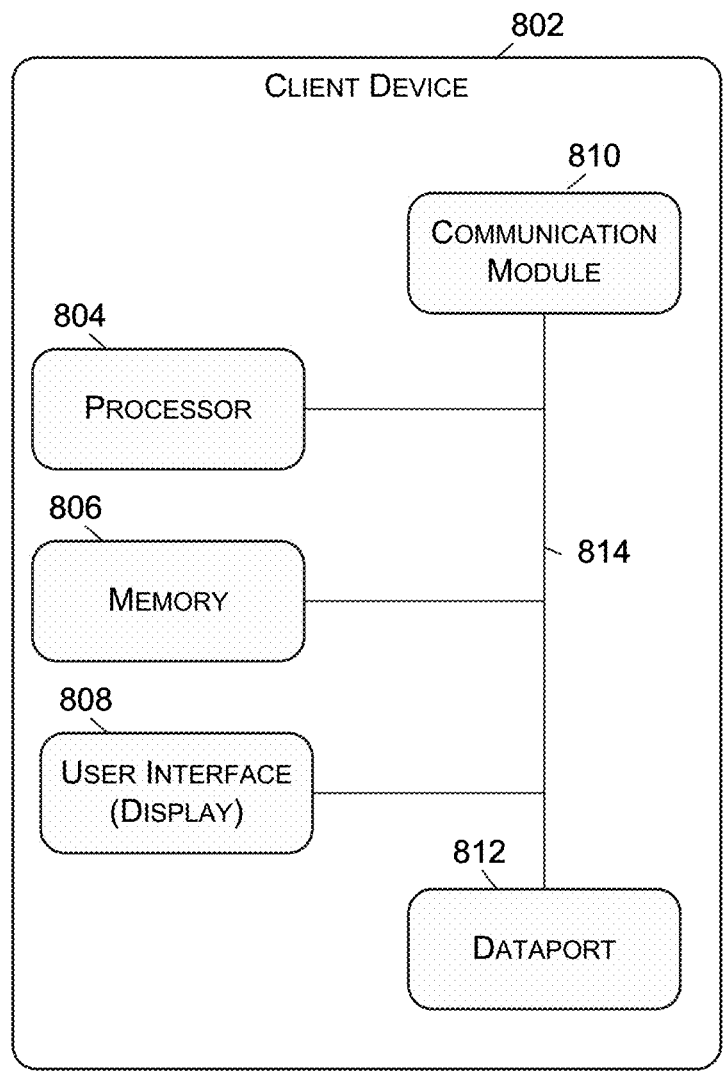
FIG. 8 is a functional block diagram of a client device on which the present embodiments may be implemented according to various aspects of the present disclosure.

FIG. 8 is a functional block diagram of a client device 802 on which the present embodiments may be implemented according to various aspects of the present disclosure. The client device(s) 214, 216 described with reference to FIG. 2 may include some or all of the components and/or functionality of the client device 802. The client device 802 may comprise, for example, a smartphone.

With reference to FIG. 8, the client device 802 includes a processor 804, a memory 806, a user interface 808, a communication module 810, and a dataport 812. These components are communicatively coupled together by an interconnect bus 814. The processor 804 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 806 may include both operating memory, such as random-access memory (RAM), as well as data storage, such as read-only memory (ROM), hard drives, flash memory, or any other suitable memory/storage element. The memory 806 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 804 and the memory 806 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 804 may be connected to the memory 806 via the dataport 812.

The user interface 808 may include any user interface or presentation elements suitable for a smartphone and/or a portable computing device, such as a keypad, a display screen, a touchscreen, a microphone, and a speaker. The communication module 810 is configured to handle communication links between the client device 802 and other, external devices or receivers, and to route incoming/outgoing data appropriately. For example, inbound data from the dataport 812 may be routed through the communication module 810 before being directed to the processor 804, and outbound data from the processor 804 may be routed through the communication module 810 before being directed to the dataport 812. The communication module 810 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 812 may be any type of connector used for physically interfacing with a smartphone and/or a portable computing device, such as a mini-USB port or an IPHONE®/IPOD® 30-pin connector or LIGHTNING® connector. In other embodiments, the dataport 812 may include multiple communication channels for simultaneous communication with, for example, other processors, servers, and/or client terminals.

The memory 806 may store instructions for communicating with other systems, such as a computer. The memory 806 may store, for example, a program (e.g., computer program code) adapted to direct the processor 804 in accordance with the present embodiments. The instructions also may include program elements, such as an operating system. While execution of sequences of instructions in the program causes the processor 804 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 9:
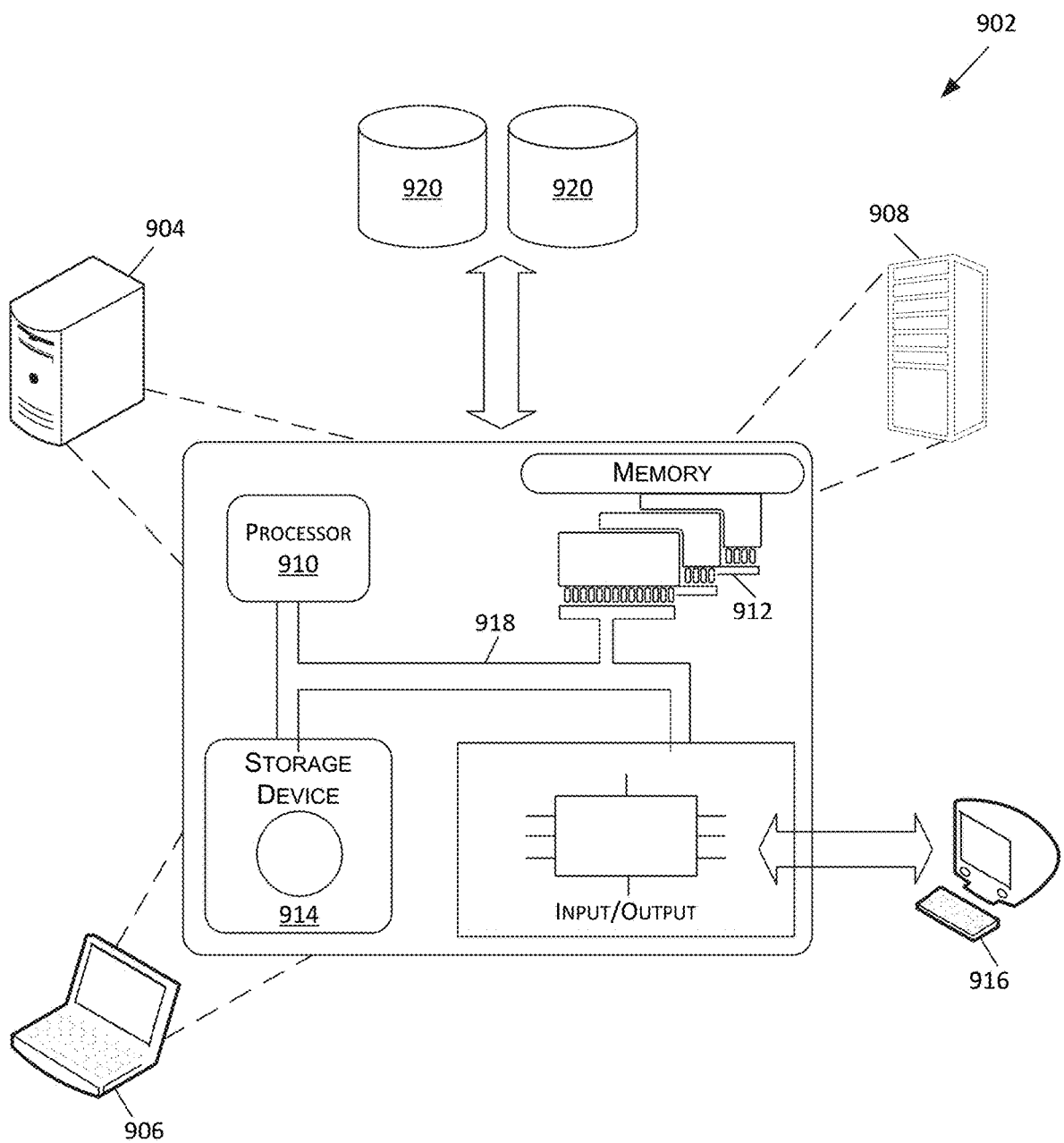
FIG. 9 is a functional block diagram of a general-purpose computing system on which the present embodiments may be implemented according to various aspects of present disclosure.

FIG. 9 is a functional block diagram of a general-purpose computing system on which the present embodiments may be implemented according to various aspects of the present disclosure. The computer system 902 may be embodied in at least one of a personal computer (also referred to as a desktop computer) 904, a portable computer (also referred to as a laptop or notebook computer) 906, and/or a server 908 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 902 may execute at least some of the operations described above. The computer system 2102 may include at least one processor 910, memory 912, at least one storage device 914, and input/output (I/O) devices 916. Some or all of the components 910, 912, 914, 916 may be interconnected via a system bus 918. The processor 910 may be single- or multi-threaded and may have one or more cores. The processor 910 execute instructions, such as those stored in the memory 912 and/or in the storage device 914. Information may be received and output using one or more I/O devices 916.

The memory 912 may store information, and may be a computer-readable medium, such as volatile or non-volatile memory. The storage device(s) 914 may provide storage for the system 902 and, in some embodiments, may be a computer-readable medium. In various aspects, the storage device(s) 914 may be a flash memory device, a hard disk device, an optical disk device, a tape device, or any other type of storage device.

The I/O devices 916 may provide input/output operations for the system 902. The I/O devices 916 may include a keyboard, a pointing device, and/or a microphone. The I/O devices 916 may further include a display unit for displaying graphical user interfaces, a speaker, and/or a printer. External data may be stored in one or more accessible external databases 920.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for identifying a person committing a crime, the method comprising:
    associating, at a backend server, a video doorbell with a neighborhood network;
    receiving, from the video doorbell, video data of a person stealing a package from a home;
    receiving an information request message from a smartphone linked to the video doorbell to request identity of the person;
    assessing whether the video data is suitable for sharing with the neighborhood network;
    when the video data is suitable for sharing, setting access control of the video data to allow the video data to be displayed by computers registered with the neighborhood network;
    setting a display control of the video data to direct that an icon be displayed with the video data to indicate that the identity of the person is desired;
    receiving identity information about the person in the video data from one of the computers;

sending the identity information to a police portal;
receiving, from the police portal, a rating indicating usefulness of the identity information in solving the crime of stealing the package;
determining a value based upon the rating; and
adding the value to an account associated with the one computer, where the account accumulates value based upon the usefulness.

2. The method of claim 1, wherein the video data is captured by the video doorbell in response to detected motion of the person near the entrance to the home.

3. The method of claim 1, wherein the one computer receives the identity information after a selection of the icon displayed with the video data.

4. A security video data processing system, comprising:
at least one processor; and
memory storing machine readable instructions that, when executed by the at least one processor, control the at least one processor to:
  receive an information request message identifying video data captured by a security device of an event at a site and a need for information about the video data;
  determine that the video data is suitable for sharing within a geographic network including the security device;
  set an access control of the video data to allow a client device registered with the geographic network to display the video data;
  set a display control value of the video data to display a label with the video data to indicate the need for the information;
  receive the information from the client device;
  determine a rating of usefulness of the information; and
  add a first value based at least in part upon the rating, to an account associated with the client device.

5. The security video data processing system of claim 4, wherein the geographic network corresponds to a geographic area containing the site and a registered geographic location of the client device.

6. The security video data processing system of claim 5, the memory further comprising machine readable instructions that, when executed by the at least one processor, cause the at least one processor to define the geographic area based at least in part upon input from an enforcement portal and a location of the security device.

7. The security video data processing system of claim 4, wherein the display control value controls an application running on the client device to display the label with the video data to indicate the need for the information.

8. The security video data processing system of claim 4, the memory further storing machine readable instructions that, when executed by the at least one processor, cause the at least one processor to determine the display control value based upon an urgency of the information.

9. The security video data processing system of claim 8, the memory further storing machine readable instructions that, when executed by the at least one processor, cause the at least one processor to determine the first value based at least in part upon the display control value.

10. The security video data processing system of claim 4, the memory further storing machine readable instructions that, when executed by the at least one processor, cause the at least one processor to add a second value based at least in part upon the rating to a second account associated with a second client device from which the information request message was received.

11. The security video data processing system of claim 4, wherein the information request message is received from an enforcement portal.

12. The security video data processing system of claim 4, the memory further storing machine readable instructions that, when executed by the at least one processor, cause the at least one processor to:
  send the information to an enforcement portal; and
  receive the rating from the enforcement portal.

13. The security video data processing system of claim 4, the memory further storing machine readable instructions that, when executed by the at least one processor, cause the at least one processor to adjust the display control value based, at least in part, upon one or more of a date/time of receiving the information request message, a level of interest in the information, and an amount of information received.

14. The security video data processing system of claim 13, the memory further storing machine readable instructions that, when executed by the at least one processor, cause the at least one processor to increase the display control value when one or both of the level of interest in the information increases and the amount of information received increases.

15. The security video data processing system of claim 13, the memory further storing machine readable instructions that, when executed by the at least one processor, cause the at least one processor to decrease the display control value when a period from the date/time of receiving the information request message to a current date/time is greater than a threshold value.

16. The security video data processing system of claim 4, the memory further comprising machine readable instructions that, when executed by the at least one processor, cause the at least one processor to:
  send the information to an enforcement agency; and
  receive the rating from the enforcement agency.

17. A security video data processing method, comprising:
  receiving an information request message identifying video data captured by a security device at a first location;
  storing the video data in a database;
  determining that the video data is suitable for sharing;
  setting access controls of the video data to make the video data accessible by a client device linked by a geographic network with the security device;
  setting a display control value of the video data to a non-zero value to indicate that information about the video data is needed;
  receiving the information from the client device;
  determining a rating based, at least in part, upon usefulness of the information;
  determining a first value, based, at least in part, upon the rating; and
  adding the first value to a first user account associated with the client device.

18. The security video data processing method of claim 17, further comprising adding a second value based, at least in part, upon the rating to a second user account associated with a sender of the information request message.

19. The security video data processing method of claim 17, further comprising:
  sending the information to an enforcement portal; and
  receiving the rating from the enforcement portal.

20. The security video data processing method of claim 19, further comprising:
 receiving a subsequent rating from the enforcement portal when the usefulness of the information changes; and
 adjusting the first value, based at least in part upon the subsequent rating.

\* \* \* \* \*